US012559068B2

(12) United States Patent
Chen

(10) Patent No.: US 12,559,068 B2
(45) Date of Patent: Feb. 24, 2026

(54) INTEGRATED VEHICLE BRAKING SYSTEM

(71) Applicant: ClearMotion, Inc., Billerica, MA (US)

(72) Inventor: Allen Chung-Hao Chen, San Jose, CA (US)

(73) Assignee: ClearMotion, Inc., Billerica, MA (US)

( * ) Notice: Subject to any disclaimer, the term of this patent is extended or adjusted under 35 U.S.C. 154(b) by 7 days.

(21) Appl. No.: 18/015,049

(22) PCT Filed: Jul. 9, 2021

(86) PCT No.: PCT/US2021/041030
§ 371 (c)(1),
(2) Date: Jan. 6, 2023

(87) PCT Pub. No.: WO2022/011223
PCT Pub. Date: Jan. 13, 2022

(65) Prior Publication Data
US 2023/0271594 A1 Aug. 31, 2023

Related U.S. Application Data

(60) Provisional application No. 63/050,706, filed on Jul. 10, 2020.

(51) Int. Cl.
*B60T 7/12* (2006.01)
*B60T 8/17* (2006.01)
(Continued)

(52) U.S. Cl.
CPC ................ *B60T 7/12* (2013.01); *B60T 8/172* (2013.01); *B60T 8/24* (2013.01); *B60T 8/321* (2013.01);
(Continued)

(58) Field of Classification Search
CPC ............ B60G 17/0165; B60G 17/0195; B60G 2400/204; B60G 2400/821;
(Continued)

(56) References Cited

U.S. PATENT DOCUMENTS

| 4,765,648 A | 8/1988 | Mander et al. |
| 4,831,532 A | 5/1989 | Kondo |

(Continued)

FOREIGN PATENT DOCUMENTS

| DE | 102008034908 A1 | 3/2009 |
| DE | 10 2010 023 434 A1 | 12/2011 |

(Continued)

OTHER PUBLICATIONS

International Search Report and Written Opinion mailed Sep. 7, 2015 in connection with International Application No. PCT/US2015/023951.

(Continued)

*Primary Examiner* — Tyler J Lee

(74) *Attorney, Agent, or Firm* — Wolf, Greenfield & Sacks, P.C.

(57) ABSTRACT

A vehicle control system for a vehicle having a braking system and active suspension system is provided. The vehicle control system may be configured to adjust a normal component of a wheel force at one or more wheels of the vehicle to increase an average traction force at the one or more wheels during a braking event. The vehicle control system may adjust a normal component of a wheel force at one or more wheels based on reference road information, forward-looking road information, and/or vehicle sensor data.

18 Claims, 19 Drawing Sheets

(51) Int. Cl.
| | |
|---|---|
| *B60T 8/172* | (2006.01) |
| *B60T 8/24* | (2006.01) |
| *B60T 8/32* | (2006.01) |
| *B60W 10/18* | (2012.01) |

(52) U.S. Cl.
CPC ........ *B60W 10/18* (2013.01); *B60T 2210/124* (2013.01); *B60T 2210/14* (2013.01); *B60T 2260/06* (2013.01)

(58) Field of Classification Search
CPC ......... B60T 2210/124; B60T 2210/14; B60W 10/18; B60W 10/184; B60W 10/22; B60W 2552/35; B60W 2552/40
See application file for complete search history.

(56) References Cited

U.S. PATENT DOCUMENTS

| | | | | |
|---|---|---|---|---|
| 5,061,932 | A * | 10/1991 | Tribe ................... | B60G 17/019 73/105 |
| 5,114,177 | A | 5/1992 | Fukunaga et al. | |
| 5,480,221 | A | 1/1996 | Morita et al. | |
| 5,682,980 | A | 11/1997 | Reybrouck | |
| 5,704,446 | A | 1/1998 | Chandy et al. | |
| 6,208,920 | B1 | 3/2001 | Izawa et al. | |
| 6,519,939 | B1 | 2/2003 | Duff | |
| 6,658,335 | B2 | 12/2003 | Kleinau | |
| 6,796,120 | B2 | 9/2004 | Franchet et al. | |
| 7,051,526 | B2 | 5/2006 | Geiger | |
| 7,206,678 | B2 | 4/2007 | Arduc et al. | |
| 7,431,309 | B2 | 10/2008 | Kobayashi | |
| 7,883,546 | B2 | 2/2011 | Kazerooni et al. | |
| 7,942,225 | B2 | 5/2011 | Carabelli et al. | |
| 8,776,961 | B2 | 7/2014 | Mori et al. | |
| 8,831,852 | B2 | 9/2014 | Yajima et al. | |
| 8,839,920 | B2 | 9/2014 | Anderson et al. | |
| 8,841,786 | B2 | 9/2014 | Tucker et al. | |
| 8,892,304 | B2 | 11/2014 | Lu et al. | |
| 8,930,074 | B1 * | 1/2015 | Lin ................... | B60G 17/0165 701/36 |
| 9,108,484 | B2 | 8/2015 | Reybrouck | |
| 10,300,760 | B1 | 5/2019 | Aikin et al. | |
| 10,377,371 | B2 | 8/2019 | Anderson et al. | |
| 11,104,312 | B2 | 8/2021 | Wantanabe | |
| 11,142,186 | B2 * | 10/2021 | Anderson ............. | B60W 50/14 |
| 11,370,414 | B2 * | 6/2022 | Takei ................... | B60W 10/22 |
| 11,584,183 | B2 * | 2/2023 | Furuta ................... | B60G 17/06 |
| 11,872,860 | B2 * | 1/2024 | Konada ................. | B60G 17/06 |
| 11,884,118 | B2 * | 1/2024 | Furuta ............... | B60G 17/0165 |
| 11,987,092 | B2 * | 5/2024 | Hwang ................. | B60G 17/06 |
| 2004/0162663 | A1 | 8/2004 | Kogure et al. | |
| 2008/0190104 | A1 | 8/2008 | Bresie | |
| 2008/0275606 | A1 | 11/2008 | Tarasinski et al. | |
| 2009/0260935 | A1 | 10/2009 | Avadhany et al. | |
| 2010/0072760 | A1 | 3/2010 | Anderson et al. | |

| | | | | |
|---|---|---|---|---|
| 2010/0262308 | A1 | 10/2010 | Anderson et al. | |
| 2012/0247888 | A1 * | 10/2012 | Chikuma ............... | B60G 17/08 701/38 |
| 2013/0218414 | A1 | 8/2013 | Meitinger et al. | |
| 2014/0195112 | A1 | 7/2014 | Lu et al. | |
| 2014/0265168 | A1 | 9/2014 | Giovanardi et al. | |
| 2015/0171674 | A1 * | 6/2015 | Lee .......................... | H02P 25/22 310/46 |
| 2015/0224845 | A1 * | 8/2015 | Anderson ................. | F03G 7/08 701/37 |
| 2015/0298680 | A1 | 10/2015 | Matthews | |
| 2016/0201277 | A1 | 7/2016 | Svantesson et al. | |
| 2016/0347144 | A1 * | 12/2016 | Suissa .................... | B60G 15/06 |
| 2017/0136842 | A1 | 5/2017 | Anderson et al. | |
| 2017/0137023 | A1 * | 5/2017 | Anderson .......... | B60G 17/0165 |
| 2017/0217276 | A1 | 8/2017 | Banvait et al. | |
| 2017/0349022 | A1 * | 12/2017 | Masamura .............. | F16F 9/461 |
| 2018/0111607 | A1 | 4/2018 | Fujita | |
| 2019/0023095 | A1 | 1/2019 | Ficca et al. | |
| 2019/0047527 | A1 | 2/2019 | Falconer et al. | |
| 2019/0283733 | A1 * | 9/2019 | Takei ................. | B60G 17/0195 |
| 2019/0381998 | A1 * | 12/2019 | Anderson ............. | B60G 17/02 |
| 2022/0097682 | A1 | 3/2022 | Anderson et al. | |

FOREIGN PATENT DOCUMENTS

| | | | |
|---|---|---|---|
| EP | 4067126 | A1 | 10/2022 |
| GB | 2465836 | A | 6/2010 |
| JP | H023511 | A | 1/1990 |
| JP | H03109115 | A | 5/1991 |
| JP | H10129230 | A | 5/1998 |
| JP | H10278530 | A | 10/1998 |
| JP | 2004-66996 | A | 3/2004 |
| JP | 2012-66785 | A | 4/2012 |
| JP | 2020-90108 | A | 6/2020 |
| WO | WO 02/20319 | A1 | 3/2002 |
| WO | WO 2009/069793 | A1 | 6/2009 |
| WO | WO 2010/066416 | A1 | 6/2010 |
| WO | WO 2011/154026 | A1 | 12/2011 |
| WO | WO 2011/159874 | A2 | 12/2011 |
| WO | WO 2014/145018 | A2 | 9/2014 |
| WO | WO 2015/153811 | A1 | 10/2015 |

OTHER PUBLICATIONS

International Preliminary Report on Patentability mailed Oct. 13, 2016 in connection with International Application No. PCT/US2015/023951.

International Search Report and Written Opinion mailed Jan. 5, 2022 for International Application No. PCT/US2021/041030.

International Preliminary Report on Patentability mailed Jan. 19, 2023 for International Application No. PCT/US2021/041030.

Alleyne, Improved vehicle performance using combined suspension and braking forces. Vehicle System Dynamics, 27 (1997), pp. 235-265.

* cited by examiner

INTEGRATED VEHICLE BRAKING SYSTEM

RELATED APPLICATIONS

This application is a national stage filing under 35 U.S.C. § 371 of International Patent Application Serial No. PCT/US2021/041030, filed Jul. 9, 2021, which claims priority under 35 U.S.C. § 119 (e) to U.S. Provisional Application Ser. No. 63/050,706, filed Jul. 10, 2020, the entire contents of each of which are incorporated herein by reference in their entirety.

FIELD

Disclosed embodiments are related to integrated vehicle braking systems, active suspension systems, and related methods of use.

BACKGROUND

Conventional vehicle braking systems are designed to reduce a speed of a vehicle or stop the vehicle. Most braking systems act by applying a retarding torque to one or more of wheels of the vehicle and thus creating longitudinal (e.g., along the direction of travel of the vehicle) slip in the tire at the contact point with the ground (e.g., the tire contact patch). This slip in turn creates a longitudinal force related to the normal load and the friction coefficient between the tire and the ground.

SUMMARY

In some embodiments, a vehicle includes a first wheel, a second wheel, a braking system configured to apply braking force to the first wheel and the second wheel, and an active suspension system operatively coupled to the first wheel and the second wheel, where the active suspension system is configured to apply active forces to the first wheel and the second wheel in at least one mode of operation to adjust a normal component of a first wheel contact force between the first wheel and a road surface and to adjust a normal component of a second wheel contact force between the second wheel and the road surface. The vehicle also includes at least one processor configured to control the braking system and the active suspension system. The at least one processor is configured to determine a location of the vehicle, obtain reference road information corresponding to the location of the vehicle, and control the braking system and the active suspension system based at least partially on the obtained reference road information.

In some embodiments, a method of controlling a vehicle including a braking system and an active suspension system, where the active suspension system is operatively coupled to a first wheel and a second wheel, includes determining a location of the vehicle, obtaining reference road information corresponding to the location of the vehicle, and controlling the braking system and the active suspension system based at least partially on the obtained reference road information, where controlling the active suspension system includes applying active forces to the first wheel and the second wheel to adjust a normal component of a first wheel contact force between the first wheel and a road surface and to adjust a normal component of a second wheel contact force between the second wheel and the road surface.

In some embodiments, a vehicle includes a first wheel, a second wheel, a braking system configured to apply braking force to the first wheel and the second wheel, and an active suspension system operatively coupled to the first wheel and the second wheel, where the active suspension system is configured to apply active forces to the first wheel and the second wheel in at least one mode of operation to adjust a normal component of a first wheel contact force between the first wheel and a road surface and to adjust a normal component of a second wheel contact force between the second wheel and the road surface. The vehicle also includes a forward-looking sensor configured to sense forward-looking road information, and at least one processor configured to control the braking system and the active suspension system. The at least one processor is configured to receive the forward-looking road information from the forward-looking sensor and control the braking system and the active suspension system based at least partially on the obtained forward-looking road information.

In some embodiments, a method of controlling a vehicle including a braking system and an active suspension system, where the active suspension system is operatively coupled to a first wheel and a second wheel, includes sensing forward-looking road information with a forward-looking sensor, and controlling the braking system and the active suspension system based at least partially on the forward-looking road information, where controlling the active suspension system includes applying active forces to the first wheel and the second wheel to adjust a normal component of a first wheel contact force between the first wheel and a road surface and to adjust a normal component of a second wheel contact force between the second wheel and the road surface.

In some embodiments, a method of controlling a vehicle including a braking system and an active suspension system includes determining that a braking event is in progress, determining that a braking force demand for a first wheel during the braking event exceeds a threshold braking force, and, upon determining that the braking force demand exceeds the threshold braking force, adjusting a normal component of a wheel force at one or more wheels of the vehicle with the active suspension system to increase an average traction force at the first wheel during the braking event.

In some embodiments a method of controlling a vehicle including a braking system and an active suspension system includes determining that a braking event is in progress, determining a pitch frequency of pitch oscillations of the vehicle, and adjusting a normal component of a wheel force at one or more wheels with the active suspension system to damp the pitch oscillations at the pitch frequency during the braking event.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
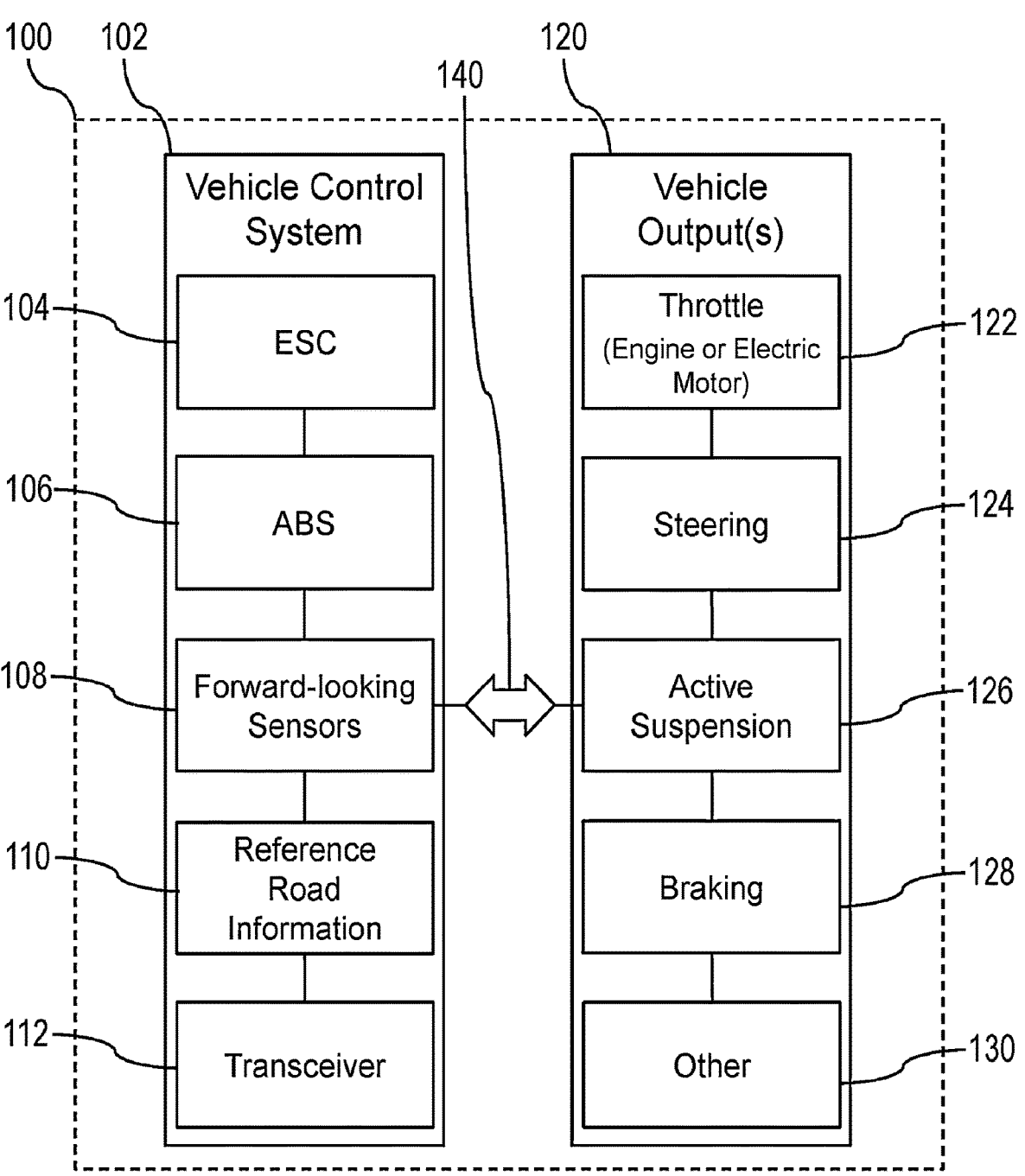
FIG. 1 is a block diagram of one embodiment of a vehicle including a vehicle control system and vehicle outputs for the vehicle control system.

In conventional automotive systems, major subsystems of a vehicle such as the brake controller or traction control system may be designed separately, and then subsequently combined at the time of integration into a vehicle. Such subsystems may not substantially interact with one another and may not be controlled based on the combined dynamics that affect each individual subsystem. Additionally, these subsystems may not be controlled on the basis of the combined effect of each subsystem on overall vehicle dynamics. In conventional automotive systems, a brake controller may be solely responsible for vehicle control during a braking event.

In view of the foregoing, the inventors have recognized the benefits of a combined vehicle control system that incorporates overall vehicle dynamics due to the presence of strong interactions between automotive subsystems. In particular, the inventors have recognized the benefits of a combined vehicle control system that integrates a brake system and active suspension system to improve average traction and/or vehicle handling during braking events. Additionally, the combined vehicle control system may be employed to improve traction and handling in circumstances of low road friction (e.g., caused by a road disturbance or road surface conditions).

In some embodiments, a vehicle control system for a vehicle having a braking system and active suspension system is provided. The braking system may be configured to apply braking force to one or more wheels of the vehicle (e.g., four wheels). The active suspension system may be operatively coupled to one or more wheels and may be configured to apply active forces to the one or more wheels in at least one mode of operation to adjust a normal component of wheel contact forces between the one or more wheels and a road surface. The vehicle control system may be configured to control the braking system and the active suspension system in a combined manner to improve the functionality of a single subsystem or both subsystems. In particular, according to exemplary embodiments described herein the vehicle control system may employ the active suspension system to improve the functionality of the braking system. In some embodiments, the vehicle control system may improve an average traction of one or more wheels of the vehicle during a braking event. As discussed further herein, in some embodiments the vehicle control system may adjust a normal component of a wheel force at one or more wheels based on reference road information, forward-looking road information, and/or vehicle sensor data.

In some embodiments, a vehicle control system may prioritize one subsystem of a vehicle over another subsystem of the vehicle. In this manner, one such subsystem may be assigned as a master controller to achieve a minimum functionality even in the event of failure or non-availability in one or more other subsystems. For example, the braking system may be assigned as the master control system. As a master control system, the braking system may rely on other systems, such as the active suspension system, when there is communication that clearly indicates the availability of the other system. The braking system may be configured go into a failsafe, more conservative, mode when the correct status response is not received from another system such as, for example, the active suspension system. In this manner, control of the braking system may be prioritized over the active suspension system such that a minimum effectiveness of the braking system may be maintained.

The inventors have recognized that the coefficient of friction between the tire and the ground, $\mu$, may depend on many factors, including the tire, the vehicle speed, and the surface conditions of the road. For example, different types of asphalt coatings can have different coefficients of friction. For example, different types of asphalt coatings can have different $\mu$, and the $\mu$ for a given surface or road section may change substantially with environmental conditions, for example due to rain, snow, mud and/or ice. The total braking force (e.g., a longitudinal force in a direction opposite a direction of travel of the vehicle) or lateral force (e.g., transverse force in a turning direction of the vehicle) available to a vehicle at any given tire is based on the coefficient of friction $\mu$ and a normal force on the tire. The nature of tire forces is such that the longitudinal force created at a certain longitudinal slip is related to the normal force on that tire through a degressive map. That is, the higher the normal force on the tire, the higher the longitudinal force, but the increase is less than directly proportional. Accordingly, the inventors have recognized that in some instances, a fluctuating normal force load with a given normal force average load may create less braking force or turning force than the same average normal force load without fluctuation. According to some embodiments herein, a vehicle control system may employ an active suspension system to increase an average normal force load or reduce fluctuation in a normal force of a tire.

The inventors have also recognized that during a braking or cornering event, a vehicle may decelerate, accelerate, and/or corner. An acceleration of the vehicle may induce an inertial force on the vehicle, which may result in an over-turning moment, since the center of gravity of the vehicle may be on a different plane relative to the tire contact point or patch. This overturning moment may be balanced by differences in the normal forces on the tires. For example, during a braking event the front tires of a vehicle may experience more normal force than the rear tires. As another example, during acceleration the rear tires may experience more normal force. As still another example, during corner-ing the outside tires experience more load. The effect of changing normal force based on the vehicle dynamics during deceleration, acceleration, and cornering is referred to herein as load transfer. According to some embodiments herein, a vehicle control system may employ an active suspension system to modify and otherwise employ load transfer to temporarily increase braking force, increase average braking force, assist with cornering, and/or mitigate an overturning moment and reduce chances of a rollover.

The inventors have also recognized that any acceleration of a sprung mass or unsprung mass of a vehicle in the vertical, pitch, or roll directions may also cause inertial moments that ultimately may be carried by one or more tires of the vehicle. Thus, if the vehicle body accelerates down-ward, such as for example during a hill cresting, the normal load on all tires decreases temporarily. This effect is tem-porary since the average load on the vehicle is equal to the total mass of the vehicle. At the same time, this temporary effect is important in that bouncing of the tires or of the vehicle body may cause temporary increases and decreases of the normal load. As discussed previously, fluctuation in normal load on a tire may be detrimental to the behavior of the vehicle as it decreases the ability of the vehicle to induce longitudinal and lateral forces. At the same time, the tem-porary effect of normal load increases or decreases may be used to advantage if correctly timed such that the temporary increase in normal force corresponds with a temporary desire for higher longitudinal force (e.g., braking force), for example. According to some embodiments herein, a vehicle control system may employ an active suspension system to temporarily increase normal force load on a tire to corre-spond to a temporary call for greater tire force in the plane of the road. For example, in some embodiments, greater braking force may be desired in an emergency stopping situation, or during a temporary braking event where the duration of the braking event is determinable. Additional examples of such control and factors for determining when to implement such control are discussed further herein.

The inventors have also recognized that vehicles may be equipped with anti-lock braking systems (ABS). ABS sys-tems take advantage of the fact that longitudinal tire force is generally highest not at the highest slip ratio, but rather peaks and then drops off as tire slip increases. Accordingly, a sliding tire creates less braking force than a tire that is slipping less, and thus an ABS system prevents the brakes from "locking up", thereby permitting the tires produce higher braking force overall. ABS generally applies the brakes to let the tire slip until a certain desired slip ratio is achieved, and then releases the brakes so as to not exceed a certain value of slip. In this manner, an ABS system achieves a greater average braking force during a braking event.

However, in some embodiments, the ABS system may pulse the brakes at a brake frequency that is determined by the desired slip ratio and road conditions. According to some embodiments herein, a vehicle control system may employ an active suspension system to increase a temporary normal force load on a tire to correspond to application of brakes by the ABS system. For example, in some embodiments, the active suspension may temporarily increase the normal force load on one or more tires when the brakes are applied, allowing the normal force load to decrease when the brakes not applied.

The inventors have also recognized that applying the brakes on one side of the vehicle differently from the other side induces a yaw moment in the vehicle. That is, different braking forces on opposite sides of the vehicle generates a yaw moment in the vehicle. Such a difference in braking force may be caused by variation in road conditions between the opposing sides of the vehicle (e.g., ice patch, puddle, pothole, or other road disturbance). According to some embodiments herein, a vehicle control system may employ an active suspension system to increase a normal force load on a tire on a side of the vehicle experiencing lower braking force. By increasing the normal force load on the tire on the side of the vehicle with lesser braking force, additional braking force may be generated to balance the braking forces and reduce the yaw moment. Accordingly, a vehicle control system according to exemplary embodiments described herein may be used to delay the occurrence of rollover, prevent vehicle oversteer, and reduce yaw induced by braking on surfaces with a range of surface friction coefficients.

According to exemplary embodiments described herein, active suspension systems are suspension systems that can vary the normal force exerted on at least one wheel (and tire) of the vehicle by creating a relative force between the sprung and unsprung mass that includes the wheel. In some embodi-ments, an active suspension system may include hydraulic, electromagnetic, electromechanical, or hydroelectric active suspension actuators. In some embodiments, an active sus-pension system may include electric or hydraulic active roll actuators. In some embodiments, an active suspension sys-tem may include semi-active variable damper systems such as magneto-rheological or variable orifice systems. Of course, an active suspension system may include any suit-able actuators, springs, and/or dampers to adjust a normal force applied to a wheel and tire of a vehicle, as the present disclosure is not so limited. In some embodiments, an active suspension may have a rapid response time and the ability to produce dynamic responses to an input. Depending on the embodiment, the response time may be less than 50 milli-seconds, less than 25 milliseconds or less than 10 millisec-onds to a command for a step change in applied vertical force (e.g., to the vehicle body), where the response time is defined as the delay between a command for a step change and reaching 90% of the steady state output. Embodiments disclosed herein provide such capability. In addition, the present active safety suspension system can exploit the multiple degrees of freedom on a vehicle by using multiple actuators in a coordinated fashion. In some embodiments, active suspension system responses can be vectored normal to the road to produce instantaneous or short duration (e.g., approximately half the period of the natural frequency of the vehicle body on the main suspension springs) changes in wheel force tailored and timed precisely to the vehicle state parameter information the suspension system determines or receives from other vehicle subsystems (e.g., a braking system such as an ABS system).

In some embodiments, a vehicle control system may include one or more driver assistance systems that aid driver tasks such as directional and speed control inputs such as steering, braking, or acceleration. In some embodiments, a vehicle control system may employ the one or more driver assistance systems in control of a braking system and/or active suspension system. In some embodiments, the one or more driver assistance systems may provide information to the braking system and/or active suspension system. For example, in some embodiments, a driver assistance system may provide forward-looking road information to the vehicle control system. The forward-looking roading information may include upcoming road disturbances, information regarding other vehicles, information regarding obstacles, information regarding turns, or any other information. A driver assistance system may include, but is not limited to, automatic braking systems (e.g., reacting for example to an unseen obstacle), lane assist systems (e.g., maintaining the vehicle in the driving lane if no other input is provided), and blind spot warning systems (e.g., alerting the driver to a vehicle in their blind spot behind).

According to exemplary embodiments described herein, a vehicle control system may be operated by one or more processors. The one or more processors may be configured to execute computer readable instructions stored in volatile or non-volatile memory. The one or more processors may communicate with one or more actuators associated with various elements of the vehicle (e.g., braking system, active suspension system, driver assistance system, etc.) to control activation and movement of the various elements of the vehicle. The one or more processors may receive information from one or more sensors that provide feedback regarding the various elements of the vehicle. For example, the one or more processors may receive position information regarding the vehicle from a Global Positioning System (GPS) or other positioning system. The sensors on board the vehicle may include, but are not limited to, wheel rotation speed sensors, inertial measurement units (IMUs), optical sensors (e.g., cameras, LIDAR), radar, suspension position sensors, gyroscopes, etc. In this manner, the vehicle control system may implement proportional control, integral control, derivative control, a combination thereof (e.g., PID control), or other control strategies of various elements of the vehicle. Other feedback or feedforward control schemes are also contemplated, and the present disclosure is not limited in this regard. Any suitable sensors in any desirable quantities may be employed to provide feedback information to the one or more processors. Information from sensors may be employed in coordination with desirable processing techniques (e.g., machine vision). The one or more processors may also communicate with other controllers, computers, and/or processors on a local area network, wide area network, or internet using an appropriate wireless or wired communication protocol. It should be noted that while exemplary embodiments described herein are described with reference to a single processor, any suitable number of processors may be employed as a part of a vehicle, as the present disclosure is not so limited.

In some embodiments, a method of controlling a vehicle including a braking system and an active suspension system includes determining that a braking event is in progress. In some cases, it may be determined that a braking event is in progress when the brakes are applied by the braking system. In some embodiments, it may be determined that a braking event is in progress by the activation of a driver assistance aid like an emergency braking system. In some embodiments, it may be determined that a braking event is in progress based on the detection of an obstacle or other vehicle ahead of the vehicle. The method may also include determining that a braking force demand for a first wheel during the braking event exceeds a threshold braking force, and, upon determining that the braking force demand exceeds the threshold braking force, adjusting a normal component of a wheel force at one or more wheels of the vehicle with the active suspension system to increase an average traction force at the first wheel during the braking event. The threshold braking force may be set based on a target longitudinal slip of a tire. In some embodiments, the threshold braking force may be set such that the active suspension system is configured to increase the normal component of the wheel force before the tire longitudinal slip increases above a value in which an ABS system would be activated. In some embodiments, the threshold braking force may be set such that the active suspension system may not be used during routine braking events, for the purpose of increasing the normal component of the wheel force, where the additional braking force generated by the adjusted normal load is not beneficial. By avoiding activating the active suspension system to increase vertical force during routine braking events, power consumption of the vehicle may be reduced compared with always activating the active suspension system to increase vertical force for every braking event. Of course, in some embodiments the active suspension system may be used, for the purpose of increasing the normal component of the wheel force, for every or almost every braking event, as the present disclosure is not so limited.

In some embodiments a method of controlling a vehicle including a braking system and an active suspension system includes determining that a braking event is in progress. In some cases, it may be determined that a braking event is in progress from the application of brakes in a braking system. In some embodiments, it may be determined that a braking event is in progress by the activation of a driver assistance aid like an emergency braking system. In some embodiments, it may be determined that a braking event is in progress based on the detection of an obstacle or other vehicle ahead of the vehicle. As discussed previously, during a braking event load transfer may occur in a vehicle. In particular, normal load may at least partially shift from the rear wheels to the front wheels during braking. During this shift, the sprung mass of the vehicle may oscillate depending on the braking force until the oscillations are damped by the suspension system. Accordingly, in some embodiments the method may also include determining a pitch frequency of pitch oscillations of the vehicle. In some embodiments, determining the pitch frequency may include measuring acceleration data with an Inertial Monitoring Unit (IMU) and/or position information regarding one or more components of the active suspension. The method may also include adjusting a normal component of a wheel force at one or more wheels with the active suspension system to dampen the pitch oscillations at the pitch frequency during the braking event. In some embodiments, the adjustment of the normal component of the one or more wheels may be employed to damp fluctuations in the normal load on the front tires. In some embodiments, the adjustment of the normal component of the one or more wheels may dampen the pitch oscillations of a sprung mass of the vehicle.

In addition to the above, the inventors have also recognized benefits of road preview information for control of braking systems and/or active suspension systems. In some embodiments, a vehicle control system may employ road information in the control of the type and duration of activation of the active suspension system during a braking event. The vehicle control system may employ road information from one or more sources that may allow for selection from among various control strategies. In some embodiments, the road information may be reference road information that is obtained, for example, from a cloud service, server, or other vehicle. For example, in some embodiments, reference road information may be downloaded for a portion of a road surface ahead of the vehicle. The reference road information may be received from another vehicle located ahead of the vehicle downloading the information. In some embodiments, the reference road information may include crowd-sourced road conditions. In some embodiments, the reference road information may include weather analysis based on local or hyper-local weather maps. In some embodiments, the road information may be sourced from one or more forward-looking sensors onboard the vehicle. For example, such forward-looking sensors may include, but are not limited to, cameras, LIDAR, and radar. The forward-looking sensors may be configured to sense road disturbances, and other characteristics of a road surface in front of the vehicle. Various control strategies may be implemented based on information included in the forward-looking and/or reference road information. For example, different control strategies may be implemented depending on if a known pattern of slippery road about to be encountered is short or long in extent, if the pattern of slippery road alternates between the left and right sides of the vehicle, or if a lower friction surface of the slippery road surface is only on one side of the vehicle.

In some embodiments, a vehicle includes a first wheel, a second wheel, a braking system configured to apply braking force to the first wheel and the second wheel, and an active suspension system operatively coupled to the first wheel and the second wheel. The active suspension system may be configured to apply active forces to the first wheel and the second wheel in at least one mode of operation to adjust a normal component of a first wheel contact force between the first wheel and a road surface and to adjust a normal component of a second wheel contact force between the second wheel and the road surface. The vehicle also includes at least one processor configured to control the braking system and the active suspension system. The at least one processor is configured to determine a location of the vehicle, obtain reference road information corresponding to the location of the vehicle, and control the braking system and the active suspension system based at least partially on the obtained reference road information. In some embodiments, the at least one processor may determine the location of the vehicle based on input from a global positioning system (GPS), a localization-based positioning system, and/or any other appropriate type of positioning system capable of determining a location of the vehicle. In some embodiments, the reference road information may be obtained from a cloud service. In some embodiments, the reference road information may be received from a nearby second vehicle. For example, the nearby second vehicle may be located ahead of the vehicle on the road.

In some embodiments, a method of controlling a vehicle including a braking system and an active suspension system, where the active suspension system is operatively coupled to a first wheel and a second wheel, includes determining a location of the vehicle, obtaining reference road information corresponding to the location of the vehicle, and controlling the braking system and the active suspension system based at least partially on the obtained reference road information, where controlling the active suspension system includes applying active forces to the first wheel and the second wheel to adjust a normal component of a first wheel contact force between the first wheel and a road surface and to adjust a normal component of a second wheel contact force between the second wheel and the road surface. In some embodiments, controlling the active suspension system may include increasing a normal component of a wheel force at the first wheel positioned at a first corner of the vehicle and the second wheel positioned at a second opposite corner of the vehicle. In this manner, a twist force may be applied to the vehicle chassis. Such a force may be employed to increase the average normal component load of a front wheel on a side of the vehicle that experiences reduced road surface friction (e.g., due to a puddle, an ice patch, a snow patch, etc.). The reference road information may include road disturbances indicative of instances of reduced road surface friction or of reduced traction due to road unevenness, such that the vehicle control system may apply forces to the wheels with the active suspension system appropriately. In some embodiments, the first wheel and second wheel may be front wheels, and the method may include adjusting a pitch of the vehicle. In some embodiments, the first wheel and second wheel may be side wheels of the vehicle, and the method may include adjusting a roll of the vehicle. According to such embodiments, the method may include temporarily adjusting a pitch or roll of the vehicle to temporarily increase normal force load on at least one wheel. In some embodiments, such temporary adjustments may occur over a time period of 0.5 to 1 second, though other time periods may also be used.

In some embodiments, a vehicle control system employing reference road information may rely on systems and methods capable of accurate, high resolution (e.g., in some embodiments equal to sub-1-meter resolution), and repeatable localization of the vehicle. In some embodiments, a vehicle may include a GPS to allow the vehicle to be localized. In some embodiments, a vehicle may employ triangulation with radio signals (e.g., cellular signals). In some embodiments, a vehicle may employ visual identification of landmarks (e.g., signs, mile markers, etc.) to assist in localization. In some embodiments, environmental characteristics, including surface characteristics of a road or other terrain (e.g., elevation changes, slopes, banks, locations of surface extrusions such as, e.g., bumps and/or depressions, and other surface details) may be utilized for localization, e.g., to identify a location of a vehicle (e.g., a vehicle's position on a road), much like a fingerprint or facial features may be used to identify a person. Such surface-based localization may include, in some implementations, detecting a sequence of surface characteristics of a road surface traversed by a vehicle, followed by matching of the detected sequence to a sequence of reference surface characteristics that is stored in a previously generated reference map. The sequence of road characteristics may be detected by an active suspension system. For example, feedback from the active suspension system may be employed to characterize the position of the vehicle based on a previously generated reference map.

In some embodiments, reference road information may be obtained by the vehicle based on the vehicle's present location. That is, once the vehicle is localized, the vehicle may download a buffered local map of reference road information that is relevant to the vehicle at its current location. According to such an embodiment, less data may be transferred to the vehicle compared with downloading a global reference map. As the vehicle travels, continued localization may allow the vehicle to buffer additional reference road information in an area surrounding the vehicle. In some embodiments, all reference road information may be downloaded within a predetermined radius of the vehicle. In some embodiments, reference road information may be buffered based on a direction of travel of the vehicle. For example, road information for a road the vehicle has already passed may not be buffered. In some embodiments, reference road information may be generated and shared by a plurality of vehicles traveling over road surface. For example, in some embodiments, a vehicle may upload reference road information after passing over a road surface, such that the reference road information may be updated for other vehicles that subsequently travel that road surface. In this manner, the reference road information may be dynamic and update to match the current conditions on a road surface. In other embodiments, a static map with less frequent updates may be employed, as the present disclosure is not so limited.

In some embodiments, a vehicle includes a first wheel, a second wheel, a braking system configured to apply braking force to the first wheel and the second wheel, and an active suspension system operatively coupled to the first wheel and the second wheel, where the active suspension system is configured to apply active forces to the first wheel and the second wheel in at least one mode of operation to adjust a normal component of a first wheel contact force between the first wheel and a road surface and to adjust a normal component of a second wheel contact force between the second wheel and the road surface. The vehicle also includes a forward-looking sensor configured to sense forward-looking road information, and at least one processor configured to control the braking system and the active suspension system. The at least one processor is configured to receive the forward-looking road information from the forward-looking sensor and control the braking system and the active suspension system based at least partially on the obtained forward-looking road information. In some embodiments, forward-looking sensor may include, but is not limited to, one or more cameras, a LIDAR, and a radar.

In some embodiments, a method of controlling a vehicle including a braking system and an active suspension system, where the active suspension system is operatively coupled to a first wheel and a second wheel, includes sensing forward-looking road information with a forward-looking sensor, and controlling the braking system and the active suspension system based at least partially on the forward-looking road information, where controlling the active suspension system includes applying active forces to the first wheel and the second wheel to adjust a normal component of a first wheel contact force between the first wheel and a road surface and to adjust a normal component of a second wheel contact force between the second wheel and the road surface. In some embodiments, controlling the active suspension system may include increasing a normal component of a wheel force at the first wheel positioned at a first corner of the vehicle and the second wheel positioned at a second opposite corner of the vehicle. In this manner, a twist force may be applied to the vehicle chassis. Such a force may be employed to increase the average normal component load of a front wheel on a side of the vehicle that experiences reduced road surface friction (e.g., puddle, ice patch, snow patch, etc.). The forward-looking road information may include road disturbances indicative of instances of reduced road surface friction, such that the vehicle control system may apply forces to the wheels with the active suspension system appropriately. In some embodiments, the first wheel and second wheel may be front wheels, and the method may include adjusting a pitch of the vehicle. In some embodiments, the first wheel and second wheel may be side wheels of the vehicle, and the method may include adjusting a roll of the vehicle. According to such embodiments, the method may include temporarily adjusting a pitch or roll of the vehicle to temporarily increase normal force load on the wheels. In some embodiments, such temporary adjustments may occur over a time period of 0.5 to 1 second or other appropriate time period.

In some embodiments, forward-looking road information may be employed by a vehicle control system to increase coordination in vehicle handling and safety activity in braking events or other scenarios. The forward-looking information may be sourced from one or more forward-looking sensors. The forward-looking sensors may include vision sensors (e.g., stereo vision cameras), distance measurement systems such as, for example, adaptive cruise control radar, sonar, or LIDAR, and any other suitable sensor systems. In some embodiments, a processor maybe configured to detect a road disturbance based on the forward-looking road information. For example, a processor may detect an object such as another vehicle, a pedestrian, or a stationary object and determine its spatial relationship with respect to the vehicle (e.g., a distance measurement using stereo vision techniques or using a radar sensor). In some embodiments, a processor may also predict the kinematics of the vehicle and the object based on measurements and analysis, for example, during a braking event.

According to exemplary embodiments herein, a vehicle control system may be configured to determine an absolute or relative tire friction on a road surface based on feedback from one or more sensors of the vehicle. In some embodiments, tire friction may be determined based on reaching an ABS braking event. That is, when a predetermined wheel slip is reached such that the ABS system is activated, the friction may be known by the vehicle control system. However, in some instances, an ABS system activation level may be reached on one wheel or a number of wheels less than the total number of wheels of the vehicle. In such instances, a vehicle control system may know that the one or more wheels where the ABS system is not activated has a greater tire friction. In some instances, a vehicle control system may be operated based on this relative difference between wheels of a vehicle, without knowing an absolute tire friction for each wheel. In other embodiments, a vehicle control system may employ a friction estimator based on tire behavior. The friction estimator may employ measurements of wheel torque, wheel speed of a slipping wheel, and vehicle speed as measured by one or more sensors to estimate an absolute value of tire friction, or a frictional coefficient for a particular tire and road surface. In some embodiments, the vehicle control system may control a braking system and active suspension system based at least partially on the calculated frictional coefficient by the friction estimator. In such embodiments, the vehicle control system may assume the frictional coefficients may remain the same until the wheel friction measurably changes, at which point the frictional coefficients may be updated. In some embodiments, the estimated frictional coefficients for the wheels of the vehicle may be updated based on reference road information or forward-looking road information. For example, if the vehicle control system expects to encounter ice on the basis of reference road information or forward-looking road information, the expected frictional coefficients for control of the braking system and active suspension system may be reduced.

In one embodiment, a surface with different frictional coefficients, μ, on one side of the vehicle relative to the other side may be encountered (referred to as a "split μ" scenario). In some scenarios, the difference in frictional coefficients may be large, for example with a μ of 0.7-1.0 on one side of the vehicle, and a μ of 0.2-0.4 on the other side (e.g., a μ difference of 0.5 or greater). In such scenarios, if a reduction in vehicle speed is desired, the longitudinal tire force (e.g., braking force) achievable on the side with lower surface μ may be lower than the one on the side with higher μ. Such a disparity in longitudinal tire force may cause a yaw moment that may effectively pull the vehicle towards the higher μ surface. This may lead to a deviation from a desired vehicle path, which may even be sufficient to cause the vehicle to spinout and/or enter a different travel lane. In some embodiments, a vehicle control system may calculate a yaw metric based on the estimated frictional coefficients on each side of the vehicle. A yaw metric may be, for example, a threshold maximum yaw rate or yaw acceleration, a difference between braking force on each side of the vehicle, or a maximum lateral offset from the desired path, or another suitable metric describing the difference between the desired and actual path traveled by the vehicle. In some embodiments, a vehicle control system may determine if the yaw metric exceeds a threshold (e.g., a maximum yaw rate, maximum difference in braking force, etc.) and may control the braking system and an active suspension system in order to reduce the yaw metric below the threshold.

In some embodiments in which a yaw metric exceeds a threshold, the vehicle control system may apply vertical force to one or more wheels with active suspension actuators. In some embodiments, the force may be applied in a twist pattern over an extended duration, for example if the split μ scenario persists. In the twist pattern, a normal load may be increased on two wheels located at opposing corners of the vehicle. In some embodiments, the vehicle control system may apply more normal force to the front wheel encountering the lower μ surface and thus increasing the ability of the corresponding tire to produce longitudinal force. As recognized by the inventors, in some operating conditions, the front tires may create more braking force relative to the rear tires due to the fact that the deceleration of the vehicle may unload the rear end of the vehicle and at the same time more heavily load the front of the vehicle. Such application of normal force may accordingly allow the vehicle to increase the total braking force applied during a braking event.

According to exemplary embodiments described herein, if a vehicle is equipped with an active suspension that can induce a twist force on the vehicle and by extension the wheels, stability and stopping distance may be improved. In particular, application of a twist force as discussed above increases longitudinal braking force symmetry between the left and right sides of the front axle. In some embodiments, this symmetry may improve stability. In addition, the steering torque disturbance to the driver may be reduced due to the symmetry in longitudinal force, further improving vehicle stability with a driver in the loop. Additionally, given fixed stability constraints on a split-μ braking scenario with an ABS system having yaw stability targets, the stopping distance in a split-μ scenario may be reduced using said twist force strategy.

Another aspect of this invention relates to using force from an active suspension system, for example arranged in the twist direction such that two wheels on opposite corners of the vehicle are pushed up and the other two are pushed down effectively simultaneously, to alter the longitudinal forces on the vehicle in a way that mitigates undesired yaw behavior of the vehicle even under general braking situations. As an example, road crown or rutting can sometimes create a lateral pull during a braking event, and the active suspension may be used to apply a twist force to mitigate the effect. This mitigation may occur in two forms—either it may mitigate the effect and attempt to reduce metrics such as mentioned above, for example peak yaw rate or peak lateral deviation from the desired path, but it may also try to counteract the perceived behavior, for example, by mitigating the steering torque created during such a scenario. Communication between different systems in the vehicle is an important aspect in this scenario, since the braking system, the steering system, and the active suspension system all can induce yaw and must ideally work in a synchronous manner to decide how to act.

In some embodiments in which a yaw metric exceeds a threshold, a vehicle control system may control an active suspension system to apply a force on both tires on the side encountering low μ for short durations of split μ scenarios. In such embodiments, the active suspension system may accelerate the vehicle in the roll direction. This roll acceleration may allow a temporary increase of the normal load on the wheels located on the low μ surface, providing an improvement in braking performance and a reduction in yaw metric for a limited period of time. For example, in some embodiments, such a roll acceleration may be generated by the active suspension system for 0.5-1.0 seconds or more. After the application of a roll acceleration, the normal force load on the wheels located on the low μ surface may decrease temporarily, making this particular embodiment well suited for short duration split μ scenarios or scenarios where braking may be required only for a short duration of time. In some embodiments, a vehicle control system may apply a roll acceleration to the vehicle based on reference road information or forward-looking road information.

An emergency lane change scenario occurs when a vehicle is steered form one lane into an adjacent one at the highest possible speed without causing the vehicle to spin or roll over. This is particularly difficult for vehicles with a high center of gravity, such as trucks and SUVs. Conventional braking systems apply the brakes to steer the vehicle out of the turn should conditions for rollover be identified. This may lead to the vehicle sliding out of the turn and also slowing down. The inventors have recognized that, in some embodiments, an active suspension system may be employed to improve stability of a vehicle in such a scenario in coordination with a braking system. In some embodiments, a vehicle control system may command the active suspension system to lower the center of gravity of the vehicle, thus mitigating rollover and tire slip problems at the same time. In some embodiments, a vehicle control system may command the active suspension system to apply force to the wheels of the vehicle in such a way as to reduce roll acceleration of the vehicle and thus reduce the risk of rollover. In some embodiments, a vehicle control system may command the active suspension system to apply force in a twist pattern in such a way as to reduce the propensity of the vehicle to oversteer.

Similar to emergency lane change scenarios, during handling maneuvers (for example in spirited driving), the inventors have recognized that it is beneficial to achieve the highest possible traction both in the longitudinal and lateral direction, while keeping the vehicle moving in the direction the driver wants it to go and maintaining understeer targets for the vehicle. In conventional vehicles, stability control systems apply braking torque to achieve this objective, which in turn slows the vehicle down, which may be undesirable for spirited driving (e.g., in a race scenario). In some embodiments, a vehicle control system may use an active suspension system to apply an appropriate amount of twist force. In some embodiments, the twist force may be applied such that an axle, with a tire in need of traction, is evenly loaded. In some embodiments, the cornering load may be reduced on the front tires during cornering (equivalent to moving a virtual roll stabilizer of the vehicle to the rear of the vehicle but doing so by applying active suspension forces), leading to higher lateral force tolerance due to more even distribution of normal load on that axle. In a similar fashion, in some embodiments, twist force may be used to create a more even normal load distribution on the rear axle during acceleration in a rear-drive vehicle, or more neutral normal load distribution for a 4-wheel-drive vehicle. In some embodiments, the vehicle control system may determine an amount of twist force to apply by determining the force required to meet understeer targets (which in general may be desired to "steer out of the turn"). Such an application of twist force may be equivalent to moving a roll stabilizer to the front of the vehicle or shifting roll moment distribution to the front of the vehicle. In some embodiments, the vehicle control system may determine an amount of twist force to apply by determining a force required to achieve a greatest possible wheel traction. For example, in some embodiments, the vehicle control system may shift normal load distribution rearward at the beginning of a turn (e.g., during a braking phase), then shift normal load distribution to the center of the vehicle at or near a mid-point in the turn, and then shifting normal load distribution to the front of the vehicle during the exit from a turn.

According to exemplary embodiments herein, when a vehicle encounters a situation during a turn and there is a need or desire to decelerate rapidly, the application of braking force may lead to the vehicle sliding out of the turn. In some embodiments, a vehicle control system may modify the application of force with an active suspension system to prioritize supporting the braking system based on a warning signal that alerts it of an impending or ongoing braking event. For example, in some embodiments, a vehicle control system may apply twist force to maintain the vehicle driving in its optimal or desired path and to more evenly load the wheels most needed to slow down quickly (e.g., the front wheels).

Another scenario may be a situation where the vehicle is cornering and encounters a bump large enough to cause the vehicle body to oscillate (e.g., pitch oscillations). These oscillations may persist for a few cycles, and may reduce, then increase, then reduce again the lateral traction force available to the vehicle. Since the vehicle is cornering in this scenario, this may lead to a yaw disturbance that may cause the vehicle to move laterally. In some embodiments, a vehicle control system may control an active suspension system to mitigate the vehicle body acceleration and reduce the likelihood of such an occurrence. In particular, the vehicle control system may control the active suspension system to mitigate the oscillations in normal force which cause the lateral traction force to fluctuate.

In some cases, during a braking event while the vehicle is traveling on a surface with low $\mu$, e.g. less than 0.5, the following process may occur: (i) First, a high brake torque may be applied; (ii) Next, some or all the wheels may reach the point where the longitudinal force on the corresponding tire peaks and the tire may start to slide instead of rolling; (iii) At that point, a braking system may back off the brake pressure to the point where it can clearly detect tire rotation again and re-apply brake torque. This process may repeat for the duration of the braking event. During this repeated application of braking force and backing off of the brakes, the tire or wheel may be bouncing up and down (without the tire necessarily losing contact with the road surface), for example due to road surface conditions, leading to a fluctuation in vertical force that may cause the braking system to delay application of braking force compared to a tire without such fluctuations. In some embodiments, a vehicle control system may control an active suspension to temporarily increase the load on a wheel. In some embodiments, the increased loading may be timed with the brake pressure ramping up in the braking cycle, described above, to periodically achieve higher braking.

In some embodiments, when a vehicle speed reduction is desired while driving on a road that is not flat, for example a road with a high amount of unevenness, then an active suspension system in combination with a braking system may increase the achievable braking performance. In such a scenario, the road unevenness may excite motion in the vehicle's wheels (e.g., unsprung masses) and in a vehicle body (e.g., sprung mass). In some embodiments, the vehicle control system may reduce variability in the tire force on each tire, and thus achieve a higher average longitudinal tire force, leading to better braking performance (e.g., to shorter stopping distances). In some embodiments, a vehicle control system may employ reference road information and/or forward-looking road information to improve the braking performance of a vehicle. In some embodiments, the vehicle control system may determine an expected frequency of motion in one or more unsprung masses or the sprung mass of a vehicle based on the reference road information and/or forward-looking road information. In some embodiments the vehicle control system may be configured to control an active suspension system to reduce sprung mass acceleration based on the determined frequency of the motion. For example, lower frequency motions may cause the vehicle control system to damp motion in the sprung mass. In some embodiments the vehicle control system may be configured to control an active suspension system to reduce unsprung mass acceleration based on the determined frequency of the motion. For example, expected higher frequency motions may cause the vehicle control system to damp motion of the unsprung mass.

During a deceleration employing ABS intervention, for example when decelerating at 0.6 g or more, a braking system may attempt to create as much longitudinal force as possible, up to the limit of adhesion of the tires. During a braking event, as the vehicle decelerates, the vehicle body may rock forwards and backwards one or more times (in a pitching motion). For example, the vehicle may pitch forward and cause a load transfer of normal force that will load the front tires and off-load the rear tires. Subsequently, the vehicle may pitch backward, off-loading the front tires and loading the rear. The unloading of the rear tires may lead to less control of the vehicle since the vehicle without traction on the rear axle may have reduced stability. The vehicle may repeat the cycle of loading and unloading the front tires until the oscillations are damped out by the suspension system. In some embodiments, the brake torque applied by the braking system may be modulated to reduce pitching, which may, however, lead to a limited application of brake torque and thus longer stopping distances and lower average deceleration. The inventors have recognized that, in some embodiments, a vehicle control system may control an active suspension system to reduce the pitch acceleration (e.g., damp the pitch oscillations at a particular pitch frequency or range of frequencies). Additionally, in some embodiments, a vehicle control system may control an active suspension system and may spread out the energy of the rebound when the vehicle has bottomed out as far as it will go. This control strategy may result in the application of higher braking force without inducing pitch oscillations and lead to greater comfort for the occupants. In some embodiments, a vehicle control system may synchronize the pitch force application with the frequency of the braking force application by the braking system. In some such embodiments, the vehicle control system may determine a pitch frequency of the pitch oscillations based on the frequency of braking by a braking system.

In some embodiment, an active suspension system of a vehicle may be controlled based on one or more measured inputs (e.g., from sensors) during a braking or cornering event. In some cases, it may not be desirable to control an active suspension in response to all braking and/or cornering events, as the active suspension system may provide little benefit in some minor braking cases at the expense of greater power consumption. In some cases, it may not be desirable to control an active suspension system in response to major braking and/or cornering events, where such control may reduce an overall braking effectiveness of the vehicle. Accordingly, the inventors have recognized that one or more thresholds may be employed to activate and deactivate the active suspension system in response to a braking or cornering event. In some embodiments, a vehicle control system may determine that a braking force demand for a wheel exceeds a threshold braking force during a braking event. According to such an embodiment, upon determining that the braking force demand exceeds the threshold braking force, the system may adjust a normal component of a wheel force at one or more wheels of the vehicle with the active suspension system to increase an average traction force at a first wheel during the braking event. In some embodiments, a vehicle control system may determine that the braking force demand does not exceed the braking force threshold and may disable or otherwise not activate the active suspension system response to a braking event.

In some embodiments, a vehicle control system may be configured to determine the size and/or duration of a road disturbance from reference road information and/or forward-looking road information. The size and/or duration of the road disturbance or anomaly may affect a control strategy implemented by the vehicle control system. For example, a relatively small size road disturbance that is expected to last on the order of less than 1 second may call for a temporary increase in normal load on a tire by modifying pitch and/or roll acceleration of a vehicle body. As an alternative example, a long road disturbance that is expected to last greater than 1 second may call for application of a twist force, so as to avoid generating pitch or roll moments on the vehicle. Accordingly, in some embodiments, a vehicle control system may determine a mode of operation based on a road disturbance magnitude and/or duration threshold. In some embodiments, the magnitude and/or duration of the road disturbance may also be employed to activate or disable the response of the active suspension, during the duration of a braking event, to encountering a road disturbance. According to some such embodiments, upon determining whether the disturbance magnitude exceeds an activation threshold, the active suspension system may be used for the purpose of increasing the normal component of the wheel force. Correspondingly, if the disturbance magnitude does not exceed the activation threshold for a duration of a braking event, the active suspension system may not respond to such disturbances.

In some embodiments, a vehicle control system may be configured to determine a vehicle motion oscillation frequency (e.g., a pitch frequency). Depending on the vehicle motion frequency, a vehicle control system may determine whether to damp an unsprung mass or sprung mass of the vehicle. In some embodiments, the characteristics of low frequency oscillations (e.g., magnitude or energy at frequencies below or equal to 10 Hz) may cause the vehicle control system to control the active suspension system to damp a motion of the sprung mass of the vehicle. In some embodiments, high frequency oscillations (e.g., magnitude or energy at frequencies between about 10 Hz and 15 Hz) may cause the vehicle control system to control the active suspension system to damp a motion of the unsprung mass (e.g., wheels) of the vehicle. Of course, any particular frequency thresholds may be employed to determine whether to damp the unsprung or sprung mass of a vehicle, as the present disclosure is not so limited.

As used herein, an active suspension system is configured to apply active forces between one or more wheels and the vehicle body in at least one mode of operation in addition to applying resistive forces in other modes of operation. The active forces are applied in the direction of movement of the wheels. This is in contrast with conventional suspension systems that employ passive damping forces that resist movement of the wheel and/or the vehicle body.

As used herein, a road disturbance is any non-nominal road condition that may be encountered by a vehicle while traveling on a road surface. For example, a road disturbance may include, but is not limited to rough pavement, potholes, uneven lanes, variable road materials (e.g., dirt, gravel, pavement, concrete, metal, etc.), and road coverings (e.g., snow, ice, salt, sand, dirt, water, etc.).

As used herein, a braking event is any instance or period of time in which one or more brakes of a vehicle are applied, e.g., to decelerate or stop the vehicle or the vehicle is decelerated by applying a drag to one or more rotating components in the drive train (e.g., during coasting). A braking event may have any duration, as the present disclosure is not so limited. In some embodiments, a braking event may include a single application of the brakes or multiple applications of the brakes, as the present disclosure is not so limited.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 is an exemplary block diagram of one embodiment of a vehicle 100 including a vehicle control system 102 and vehicle outputs 120 for the vehicle control system. The vehicle control system may include at least one processor configured to execute computer readable instructions and control the vehicle outputs 120. As shown in FIG. 1, the vehicle control system may include an electronic stability control system 104, and anti-lock braking system (ABS 106). The electronic stability control system may be configured to automatically apply the brakes to help steer the vehicle where the driver intends to go when there is a loss of traction. As discussed previously, the ABS is configured to inhibit wheels from locking up and sliding. As shown in FIG. 1, the vehicle control system may also include a forward-looking sensor 108. The forward-looking sensor may sense road characteristics, road disturbances, or objects in front the vehicle, which may be provided to the at least one processor as forward-looking road information. In the embodiment of FIG. 1, the vehicle control system may also include reference road information 110 that may be stored in memory onboard the vehicle control system. In some embodiments as shown in FIG. 1, the vehicle control system may also include a transceiver 112 configured to send or receive information. In some embodiments, the transceiver 112 may be configured to receive the reference road information from another vehicle or cloud service (e.g., one or more servers). The transceiver may be configured to communicate wirelessly via any suitable wireless protocol, as the present disclosure is not so limited.

As shown in FIG. 1, the vehicle may include a plurality of vehicle outputs 120 which are controlled by the vehicle control system. In particular, the vehicle outputs include a throttle 122 (which may include throttle of an engine or electric motor), steering module 124, active suspension system 126, braking system 128, and other outputs 130. The vehicle control system may be configured to control these vehicle outputs individually or in various combinations. By controlling the various vehicle outputs in combination, the vehicle control system may provide enhanced stability and braking force compared to a vehicle with independent control of each system. In some embodiments, the vehicle control system may prioritize certain outputs. For example, the braking system may be prioritized over steering or the active suspension system. In this manner, the more important systems for a given scenario may be prioritized for control, with the possible assistance of other vehicle outputs. The operational modes and control schemes for the vehicle outputs are discussed further below.

In some embodiments as shown in FIG. 1, the vehicle may include a real-time bi-directional communication system 140 that enables communication between the various subsystems and vehicle outputs. The communication system may employ any appropriate connection protocol including, for example, a controller area network (CAN), a local interconnect network (LIN), a vehicle area network (VAN), FlexRay, D2B, Ethernet, a direct communication link (such as wires and optical fibers), or a wireless communication link. The communications system may be employed to share information between subsystems, like ABS or ESC, while receiving vehicle state parameters or other information from these same or other systems. Information that may be shared between subsystems and employed for vehicle output control includes, but is not limited to, for example, vehicle yaw and yaw rate, vehicle velocity, vehicle acceleration, vehicle lateral acceleration, steering wheel position, steering wheel torque, if the brakes are being applied, and suspension spring compression. The vehicle control system may control the active suspension system 126 based on information from the vehicle such as the state of one or more vehicle subsystems, such as ABS 106 and ESC 104, that engage during unusual events. For example, the system may provide different control of the wheels and vehicle if one or more systems are engaged.

In addition to the above, in some embodiments an active suspension system 126 may sense several parameters relating to the road, wheel, vehicle body movement, and other parameters that may benefit other vehicle subsystems. Such information may be transmitted from the active suspension system to the other subsystems via the communication system 140. Other vehicle subsystems may alter their control based on information from the active suspension system. As such, bidirectional information may be communicated between the active safety suspension system and other subsystems, and control of both the active suspension system and the other vehicle systems may be provided based at least partially on this information transfer. For example, application of the brakes of the braking system 128 by the ABS 106 may be synchronized with an increase of wheel force by the active suspension system for one or more wheels.

Figure 2:
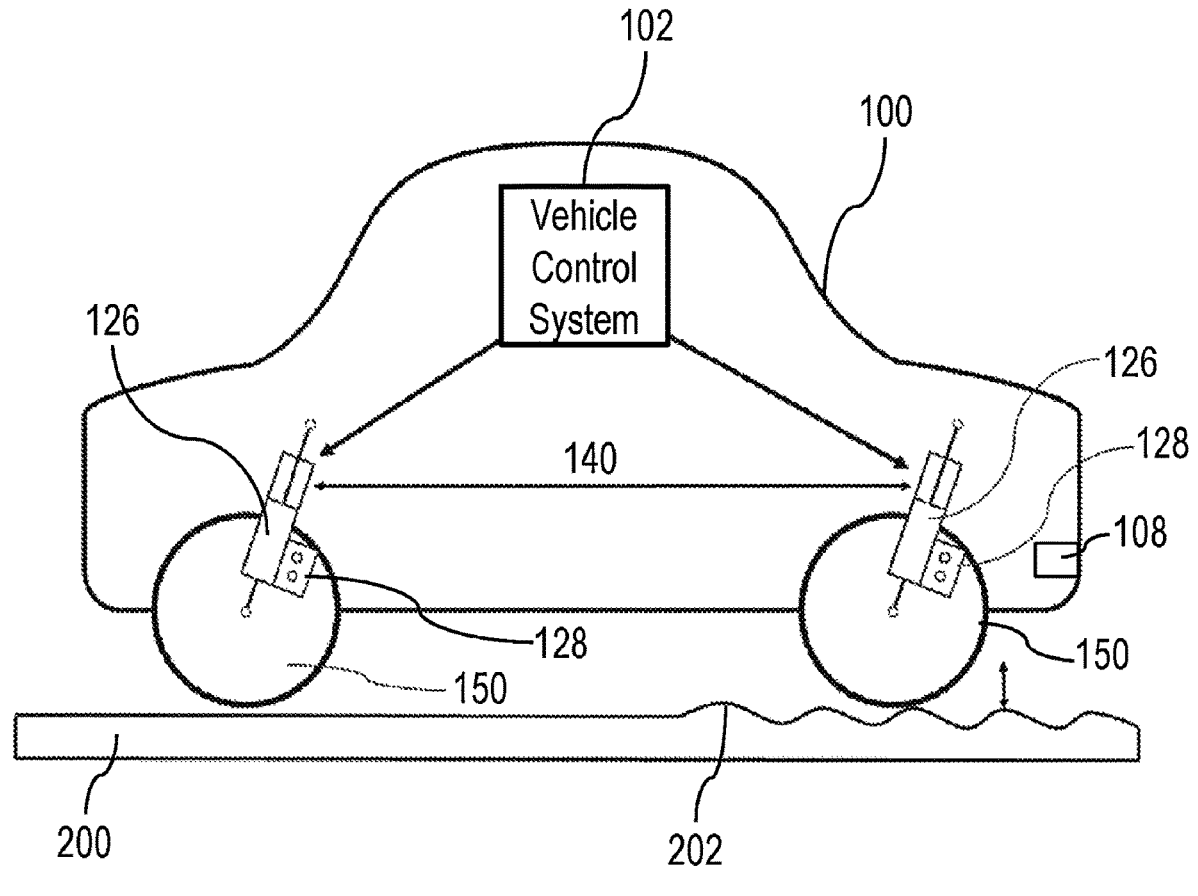
FIG. 2 is a schematic of the vehicle of FIG. 1.

FIG. 2 is a schematic of the vehicle 100 of FIG. 1. As shown in FIG. 2, the vehicle includes a vehicle control system 102 that may communicate with various subsystems via a communication system 140. As shown in FIG. 2, the vehicle includes an active suspension system 126 that is operatively coupled to the wheels 150 of the vehicle. In particular, active suspension actuators may be operatively interposed between each wheel of the vehicle and the vehicle body, such that separate actuators of the active suspension may independently control separate wheels of the vehicle. The vehicle may also include a braking system 128. The braking system may include independent brakes coupled to each of the vehicle wheels 150, such that a braking force may be applied to each wheel independently. According to the embodiment of FIG. 2, the vehicle may also include a forward-looking sensor 108. The forward-looking sensor 108 may be at least one camera, LIDAR, radar, or a combination thereof that may be configured to sense forward-looking road information that may be employed by the vehicle control system 102.

As shown in FIG. 2, the vehicle may traverse over a road 200. The road surface may include one or more road disturbances 202. The road disturbances 202 may cause fluctuations in the normal load of a wheel 150 of the vehicle (e.g., by accelerating the wheel upward and/or downward). In some embodiments, a road disturbance may reduce an effective frictional coefficient between a wheel 150 and the road 200.

Figure 3:
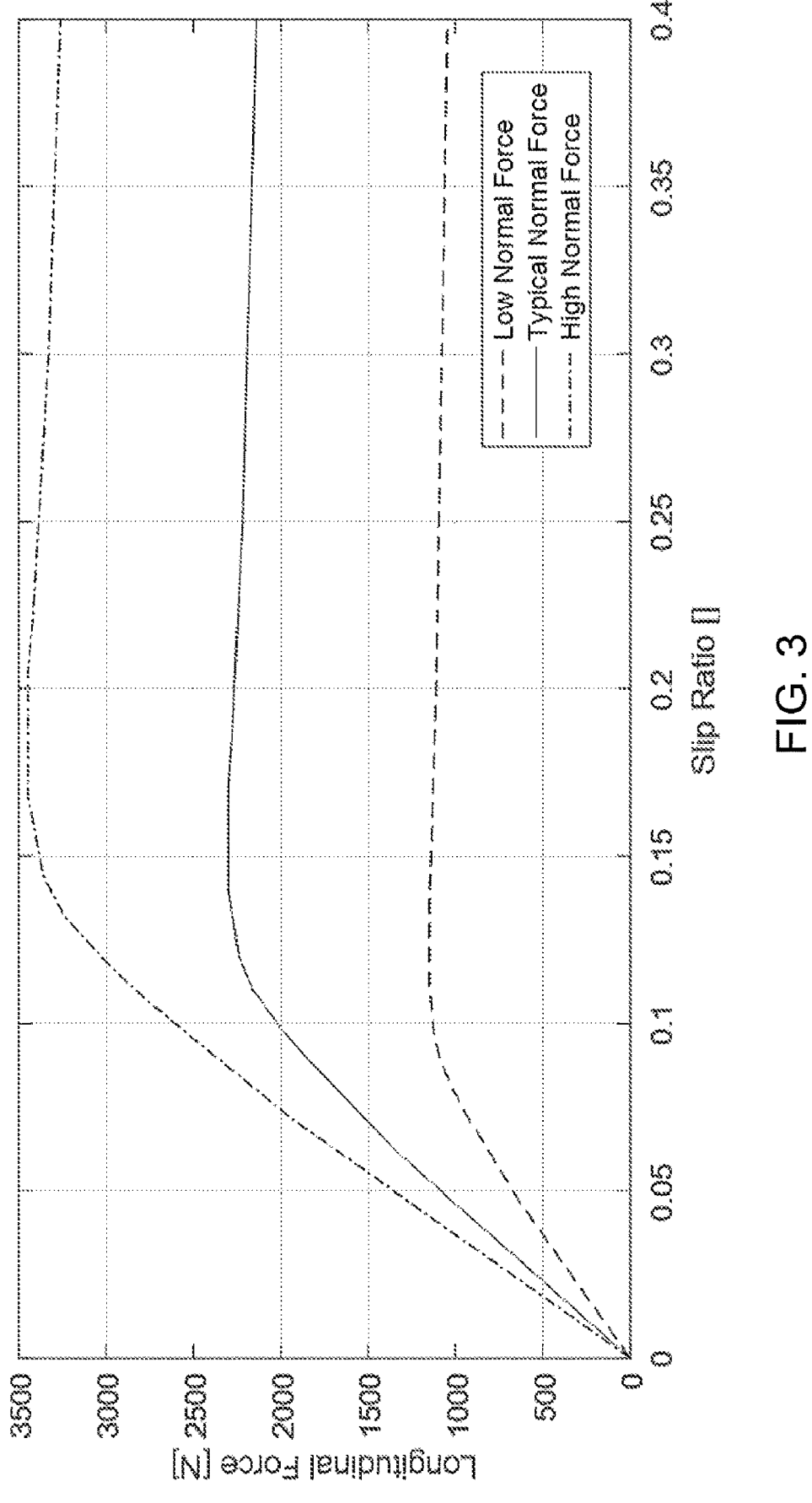
FIG. 3 is a graph of wheel slip ratio versus longitudinal force for various wheel normal forces according to some exemplary embodiments.

FIG. 3 is a graph of wheel slip ratio versus longitudinal force for various wheel normal forces according to some exemplary embodiments herein. As discussed previously, longitudinal force of a tire is a function of slip ratio, which is a measurement of a tire's rotational speed relative to a free-rolling speed. Longitudinal force of a tire increases with increased slip ratio up to a point, before peaking and falling off. To maximize braking force, an ABS system and vehicle control system may control a vehicle to target the peak value of longitudinal force. As shown in FIG. 3, the greater the normal force of the tire, the greater the maximum longitudinal force that can be generated, and the greater the slip ratio at which that peak force is achieved. Accordingly, in some scenarios, increasing the normal force of a tire may greatly improve the ability of the vehicle to generate braking force at that tire.

Figure 4A:
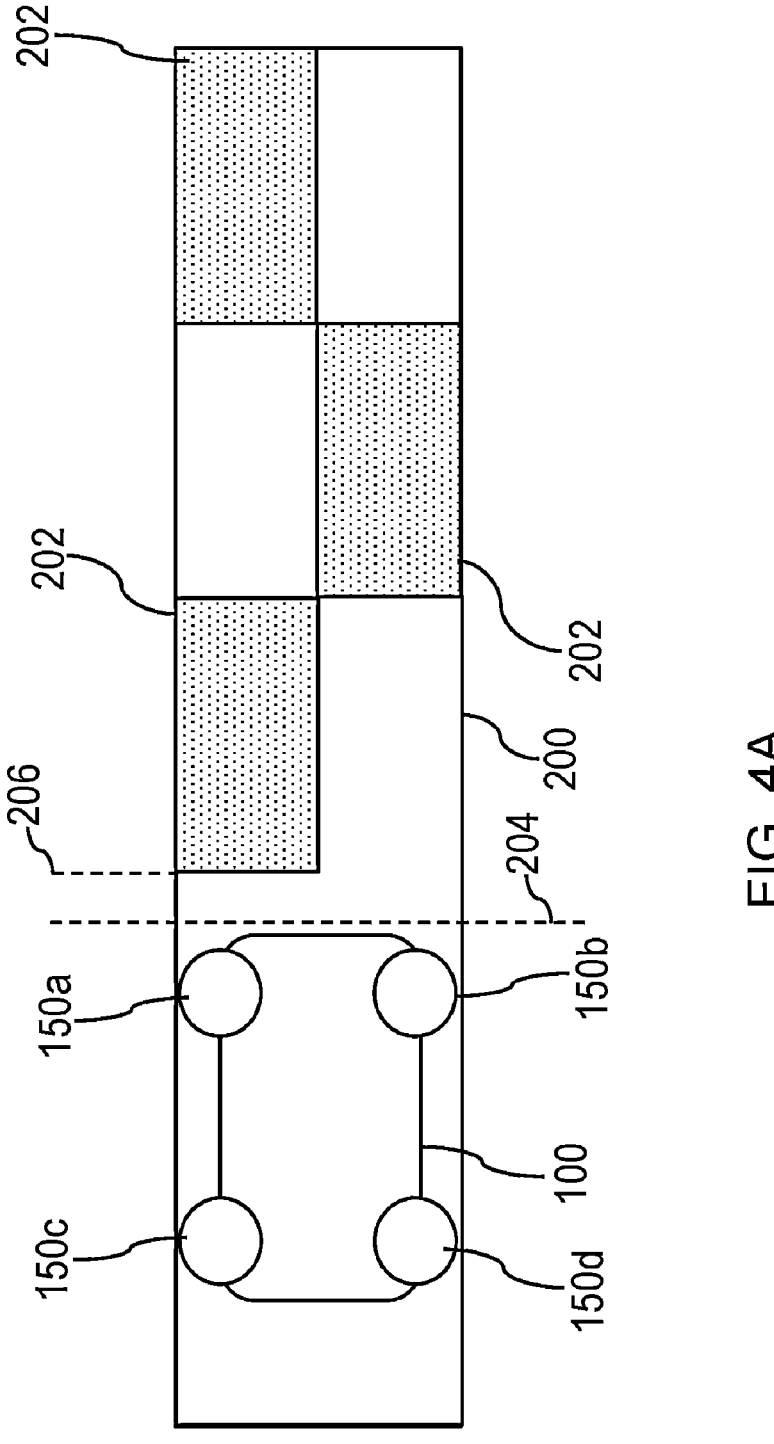
FIG. 4A is a schematic of one embodiment of a vehicle and road in a first state.
Figure 4B:
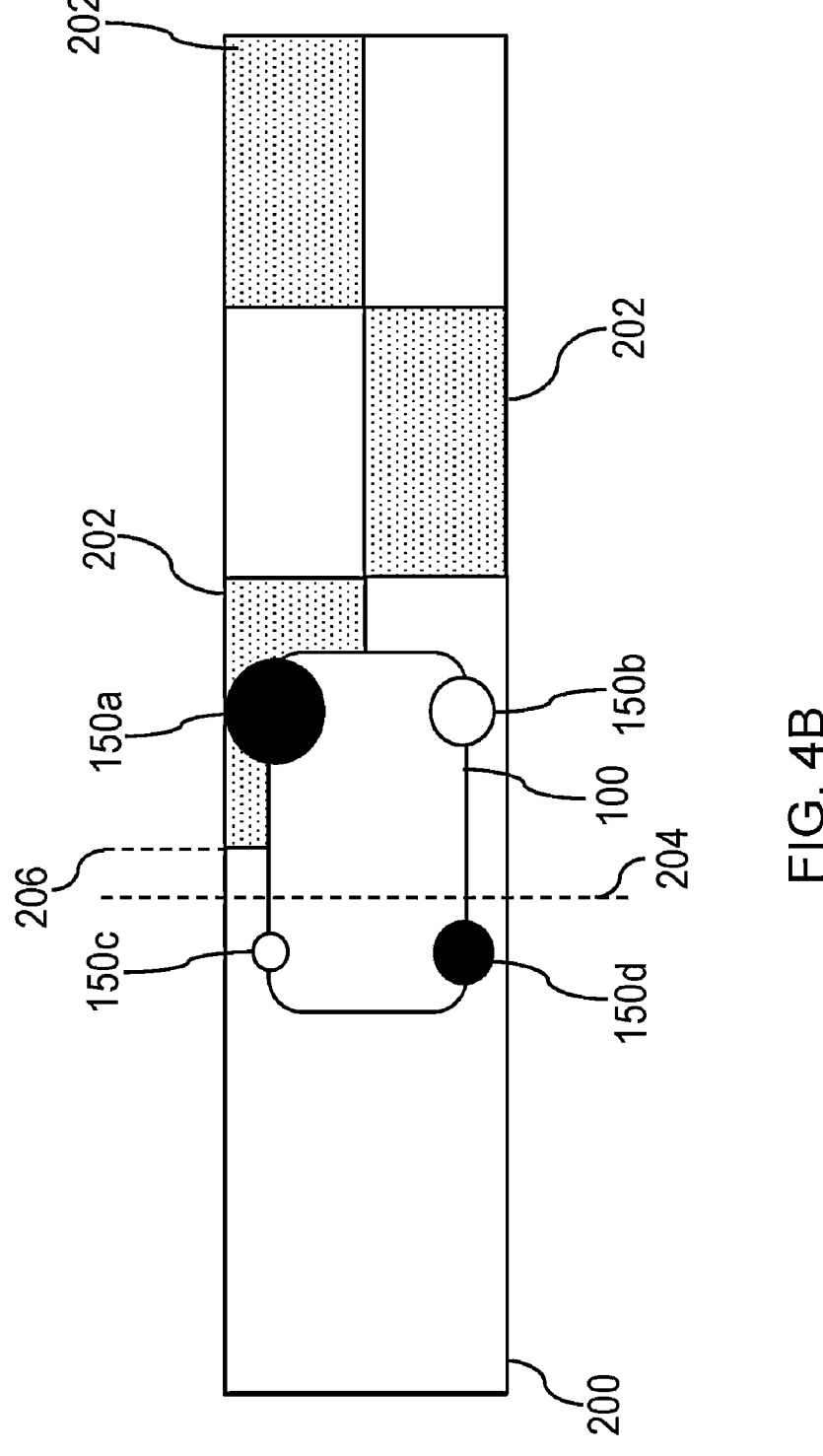
FIG. 4B is a schematic of the vehicle and road of FIG. 4A in a second state.
Figure 4C:
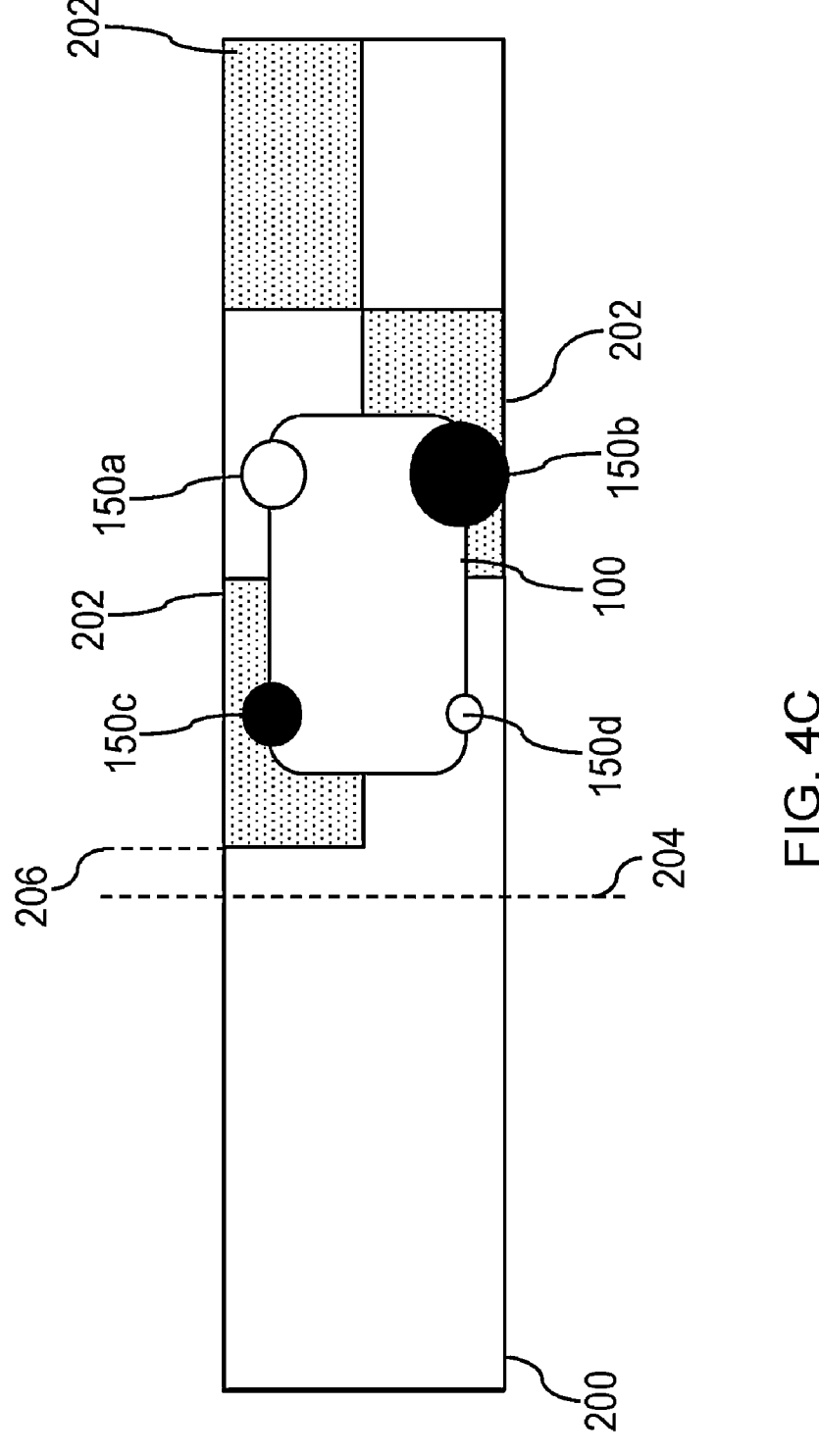
FIG. 4C is a schematic of the vehicle and road of FIG. 4A in a third state.

FIG. 4A is a schematic of an exemplary embodiment of a vehicle 100 and road 200 in a first state. As shown in the schematic of FIG. 4A, the vehicle includes a first wheel 150a (e.g., front left wheel), a second wheel 150b (e.g., front right wheel), a third wheel 150c (e.g., rear left wheel), and a fourth wheel 150d (e.g., rear right wheel). The size of the wheels shown in FIGS. 4A-4C is representative of a normal component of a wheel force at a respective wheel. As shown in FIG. 4A, the vehicle is in steady state and the normal components are accordingly balanced and approximately equal to one another. The vehicle includes an active suspension system that may be configured to independently adjust a normal component of a wheel force of each wheel.

As shown in FIG. 4A, the road 200 includes a plurality of road disturbances 202. The road disturbances of FIG. 4A may be road surfaces with lower friction relative to the nominal road surface. In the embodiment of FIG. 4A, the road disturbances create a split scenario, with different coefficients of friction between tires and the road surface on different sides of the vehicle. In the state illustrated in FIG. 4A, the vehicle is about to undergo braking at a braking start line 204. The road disturbances begin at line 206. The exemplary road disturbances of FIG. 4A are arranged in a checkerboard pattern, which may be particularly challenging for conventional vehicles to handle during braking. As discussed previously, reduced tire friction on one side of the vehicle may result in a yaw moment applied to the vehicle. This yaw moment may be compensated for via application of twist force, as discussed further with reference to FIGS. 4A-4C.

FIG. 4B is a schematic of the vehicle 100 and road of FIG. 4A in a second state. As shown in FIG. 4B, the vehicle has begun braking. First, load transfer shifts the normal load away from the rear wheels 150$c$, 150$d$, and to the front wheels 150$a$, 150$d$. As shown in FIG. 4B, the size of the third wheel 150$c$ and fourth wheel 150$d$ are reduced relative to FIG. 4A, showing the difference in normal force. In FIG. 4B, the first wheel 150$a$ has encountered the road disturbance 202. As discussed previously, the friction coefficient between the first wheel and the road 200 may be lower than wheel 150$b$ due to the disturbance 202 (for example the road disturbance may be an ice patch). In a conventional vehicle, braking force would be lower at the first wheel 150$a$ compared to the second wheel 150$b$ due to the inability of the first wheel to generate the same longitudinal force. However, in the vehicle of FIG. 4B, an active suspension system may be controlled to compensate for the difference in braking force on the two sides of the vehicle. In particular, the filled in wheels shown in FIG. 4B denote wheels at which the active suspension applies a downward force to the wheels (e.g., increases a normal load on the wheel). Accordingly, as shown in FIG. 4B, the first wheel 150$a$ and the fourth wheel 150$d$ have their normal loads increased by the active suspensions (e.g., a twist force is applied to the vehicle). As the normal loads on the first wheel 150$a$ and fourth wheel 150$d$ are increased, the normal loads on the second wheel 150$b$ and third wheel 150$c$ are correspondingly decreased. As a result, the normal load on the first wheel 150$a$ is greatest due to the combination of load transfer and twist force applied to the vehicle. The normal load on the first wheel 150$a$ is greater than the normal load on the second wheel 150$b$. This difference in normal loads between the front wheels allows additional braking force to be generated at the first wheel 150$a$, reducing a yaw moment caused by the road disturbance 202. As shown in FIG. 4B, the normal load on the fourth wheel 150$d$ is also greater than a normal load on the third wheel 150$c$.

In some embodiments, a vehicle 100 may apply the twist pattern shown in FIG. 4B when wheel slip is detected. For example, an ABS system may be activated during the braking event when the first wheel 150$a$ encounters the road disturbance 202. Accordingly, the application of twist force may be responsive. In some embodiments, the vehicle may determine that one of the front wheels is slipping more than another (e.g., the first wheel 150$a$ is slipping more than the second wheel 150$b$). Upon determining a disparity in the wheel slip on two sides of a vehicle, the twist force may be applied to the vehicle with the active suspension system. In some embodiments, the vehicle may determine an absolute value of wheel slip based on wheel torque, wheel speed, and vehicle speed for the wheels of the vehicle. If the wheel slip for one wheel exceeds a threshold, the twist force may be applied to increase a normal force load on that wheel.

In some embodiments, a vehicle 100 may apply the twist pattern shown in FIG. 4B at least partially based on reference road information and/or forward-looking road information (e.g., from a forward-looking sensor). For example, the vehicle 100 may predict the road disturbances 202 based on a priory road information and control the braking system and active suspension system accordingly. In some such embodiments, the normal force load on the first wheel 150$a$ and fourth wheel 150$d$ may be adjusted prior to the first wheel reaching line 206. In this manner, the vehicle may prepare for road disturbances to reduce their effect on the dynamics of the vehicle. In some embodiments, the reference road information or forward-looking road information may be employed to apply temporary increases in normal force load to a wheel without applying a twist force. For example, if the road disturbance 202 may have a disturbance size such that the suspension response may be applied over a duration of less than or equal to 1 second, the active suspension system may increase the normal force load of the single wheel or two wheels that encounter the disturbance. For example, the normal force load of the first wheel 150 may be increased without increasing the normal force load of the fourth wheel 150$d$. Such an arrangement may impart acceleration to a body of the vehicle 100, which may be detrimental if the road disturbance is larger in length. Accordingly, the reference road information and/or forward-looking road information may be employed to determine if a road disturbance size exceeds a road disturbance threshold so that the suspension of the vehicle may be appropriately controlled.

FIG. 4C is a schematic of the vehicle 100 and road 200 of FIG. 4A in a third state. As shown in FIG. 4C, the vehicle has advanced along the road 200 while continuing the braking event that began at line 204 illustrated in FIG. 4A. However, the wheels experiencing reduced road surface friction due to road disturbances are different than those illustrated in FIG. 4B. Accordingly, the twist force applied to the vehicle 100 has been adjusted. As shown in FIG. 4C, the second wheel 150$b$ is located on a road disturbance 202 as well as the third wheel 150$c$. Accordingly, the active suspension system may be used to increase a normal force load on the second wheel and third wheel, as shown in FIG. 4C. Increasing the normal load of these wheels compensates for a difference in braking force generated on each side of the vehicle, thereby reducing the yaw movement. In some embodiments, the twist force may be applied during a braking event based on which of the front wheels of the vehicle has a greater wheel slip. In this manner, depending on the road 200, the twist force applied may be changed back and forth based on where the additional normal force is most beneficial to reducing a yaw moment of the vehicle while braking.

In some embodiments, the active suspension force application described in FIG. 4A-C may be inverted. For example, the active suspension may increase the normal force on the front wheel experiencing higher friction (e.g., the second wheel 150$b$ in FIG. 4B) to maximize total braking force. This application of active suspension force may lead to an increased yaw disturbance imparted to the vehicle, but also to an increase in braking force on the front wheel that has the highest traction. In some embodiments, this strategy may be used in conjunction with a steering system by commanding an appropriate steering moment from the steering module 124 to mitigate any additional yaw disturbance. In some embodiments, a strategy, to balance the braking force on the two sides of the vehicle or to maximize the braking force on one side, may be determined by a vehicle control system based on information from vehicle sensors and/or upcoming road information, for example information regarding the extent and magnitude of the road event and information regarding the criticality of the braking situation (for example, if the vehicle is about to impact another vehicle ahead of it, a strategy of maximizing braking at the expense of possible yaw disturbance may be employed, or for example, if the roadway is narrow but no obstacle is detected ahead a strategy of minimizing yaw disturbance may be employed).

Figure 5:
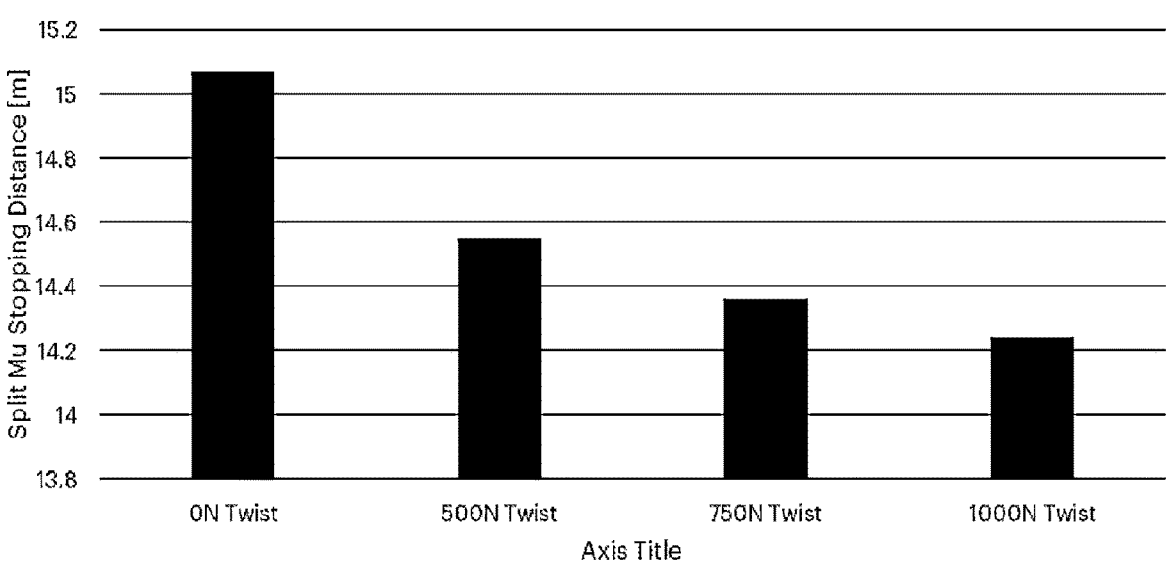
FIG. 5 is a graph of twist force applied to a vehicle with an active suspension versus stopping distance according to some exemplary embodiments.

FIG. 5 is a graph of twist force applied to a vehicle with an active suspension versus stopping distance according to some exemplary embodiments. In particular, the graph of FIG. 5 shows stopping distance based on amount of twist applied in the scenario depicted in the exemplary embodiment of FIGS. 4A-4C. As shown in FIG. 5, the stopping distance is decreased with greater application of twist force. As discussed above, the application of twist force allows additional braking force to be generated at wheels that are in contact with a low surface.

Figure 6:
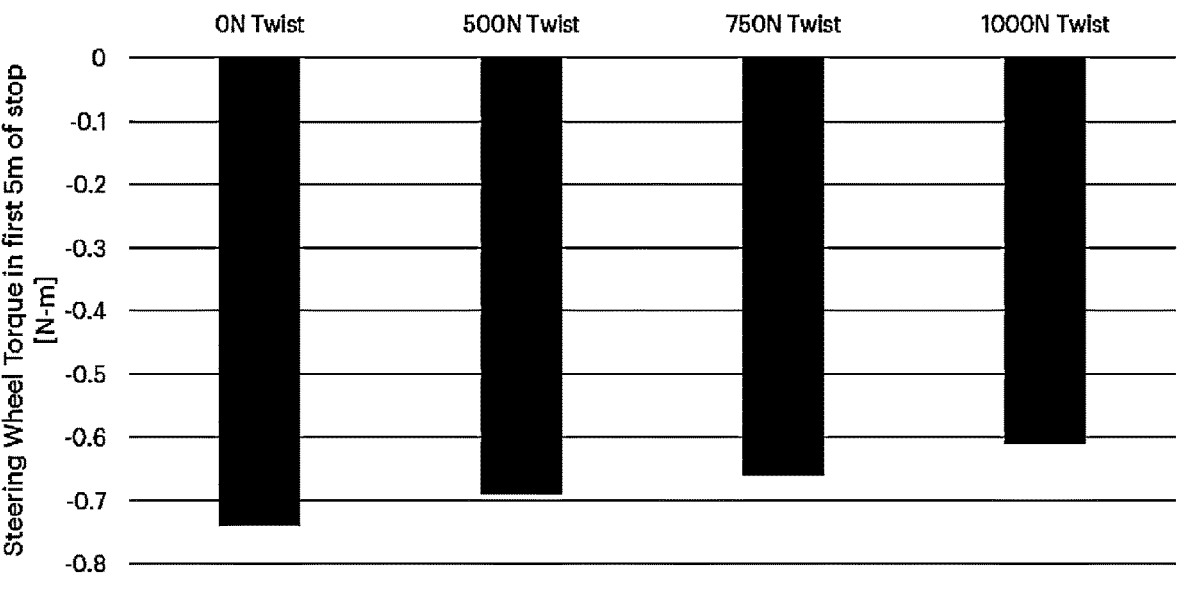
FIG. 6 is a graph of twist force applied to a vehicle with an active suspension versus steering wheel torque according to some exemplary embodiments.

FIG. 6 is a graph of twist force applied to a vehicle with an active suspension versus steering wheel torque according to some exemplary embodiments. In particular, the graph of FIG. 6 shows steering wheel torque based on the amount of twist applied in the scenario depicted in the exemplary embodiment of FIGS. 4A-4C. The wheel torque of FIG. 6 is indicative of a yaw moment generated by the split μ scenario. As shown in FIG. 6, the steering wheel torque is reduced with greater application of twist force. As discussed above, the application of twist force allows additional braking force to be generated at wheels that otherwise experience reduced friction, reducing the mismatch between braking forces on opposing sides of the vehicle. In some embodiments, this may also reduce the disturbance imparted to the steering wheel and therefore the driver.

Figure 7:
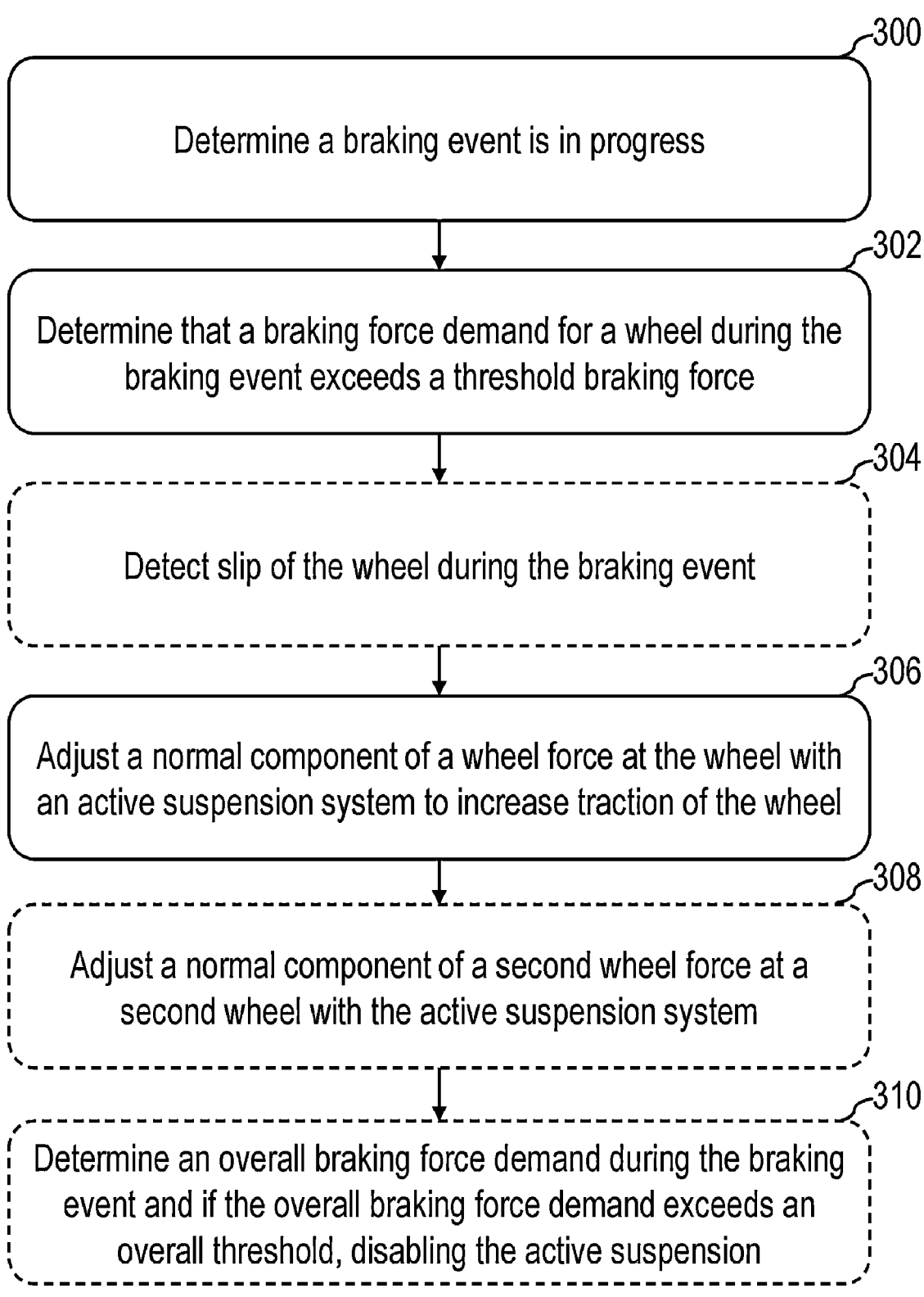
FIG. 7 is a flow chart for one embodiment of a method of controlling a vehicle.

FIG. 7 is a flow chart for one embodiment of a method of controlling a vehicle. In block 300, it is determined if a braking event is in progress. Determining whether a braking event is in progress may include detecting application of brakes by a user or other vehicle system. In block 302, a braking force demand is determined that exceed a threshold braking force. The braking force demand may exceed the threshold braking force when a wheel encounters a road disturbance, for example, and the braking force of the wheel may be diminished as a result. In optional block 304, a slip of the wheel may be detected during the braking event. For example, ABS may be activated during a braking event. In some embodiments, a friction estimator may be employed to estimate an absolute value of friction based on relative wheel slip, which may be employed to control an active suspension system. In some embodiments, the wheel slip may be estimated based on a comparison of wheel rotation and expected rotation based on vehicle speed. In block 306, a normal component of a wheel force at the wheel is adjusted with an active suspension system to increase traction of the wheel. In some embodiments, the adjustment may include an increase in the normal load of the wheel. In some embodiments, the adjustment may be based on the detected wheel slip. In optional block 308, a normal component of a first wheel force is adjusted with an active suspension system to increase traction of the first wheel. In optional block 310, it is determined if an overall braking force demand exceeds and overall threshold. If the overall braking force exceeds the threshold, the response of the active suspension system to a braking event may be temporarily disabled (e.g., for the duration of the braking event). Such an arrangement may be desirable in situations where adjusting normal components of the wheels lowers overall braking force.

Figure 8A:
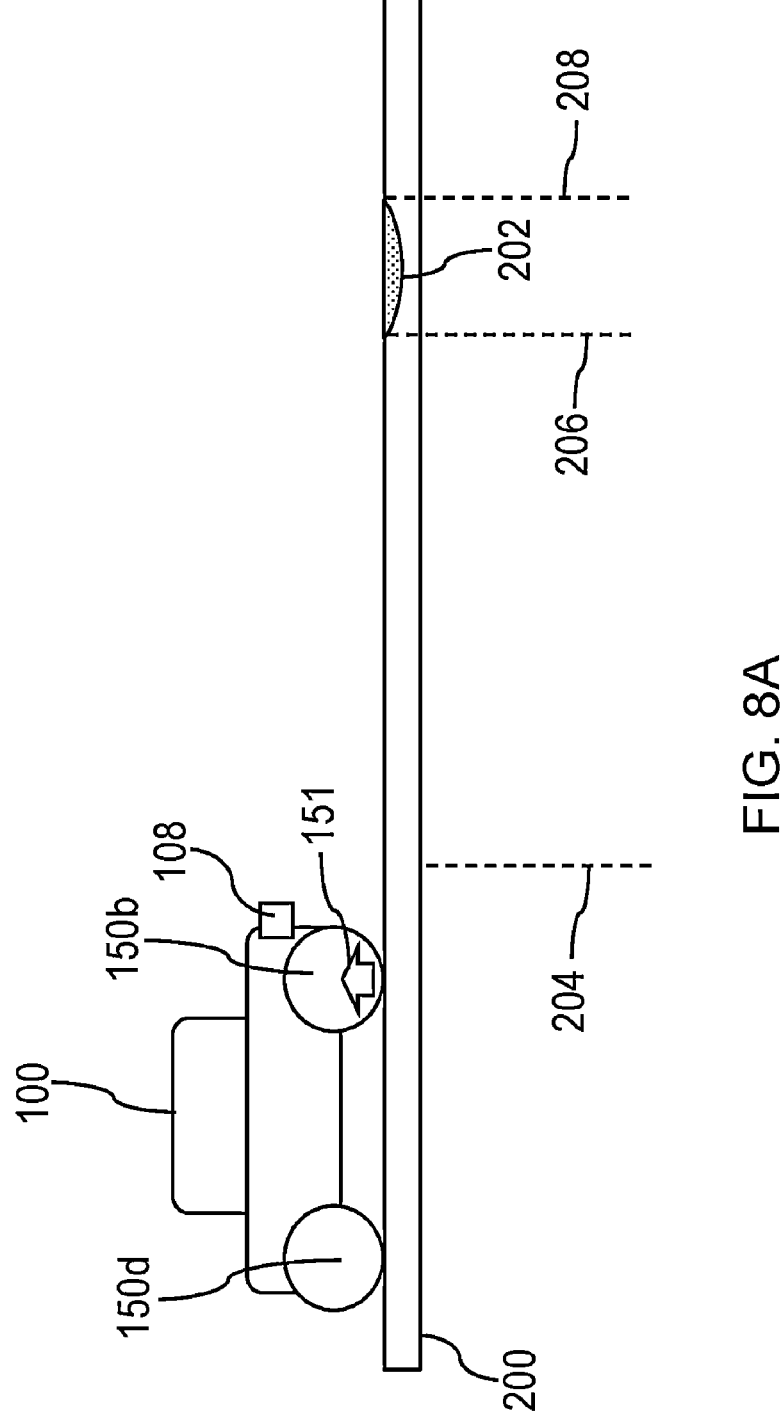
FIG. 8A is a schematic of one embodiment of a vehicle and road in a first state.

FIGS. 8A-8D depict a side schematic of another embodiment of a vehicle 100 employing an active suspension system to improve braking system performance during a braking event. As shown in FIG. 8A, the vehicle 100 includes a forward-looking sensor 108, which is configured to sense forward-looking road information and provide the information to a vehicle control system. Similar to the scenario of FIGS. 4A-4C, the scenario of FIGS. 8A-8D includes a braking event starting at line 204. The vehicle is traveling on a road 200 which includes a road disturbance. In the scenario of FIGS. 8A-8D, the road disturbance does not generate a split μ scenario, but rather induces loss of road friction for both sides of the vehicle. The road disturbance 202 begins at line 206 and ends at line 208. The road disturbance of FIGS. 8A-8D may be a patch of ice, pothole, puddle, or other road disturbance. However, the road disturbance of FIGS. 8A-8D is small in size, meaning a suspension response of an active suspension of the vehicle 100 may be temporary, as discussed further below. In the embodiments of FIGS. 8A-8D, an arrow 151 is shown to demonstrate the normal force load on a front axle of the vehicle.

Figure 8B:
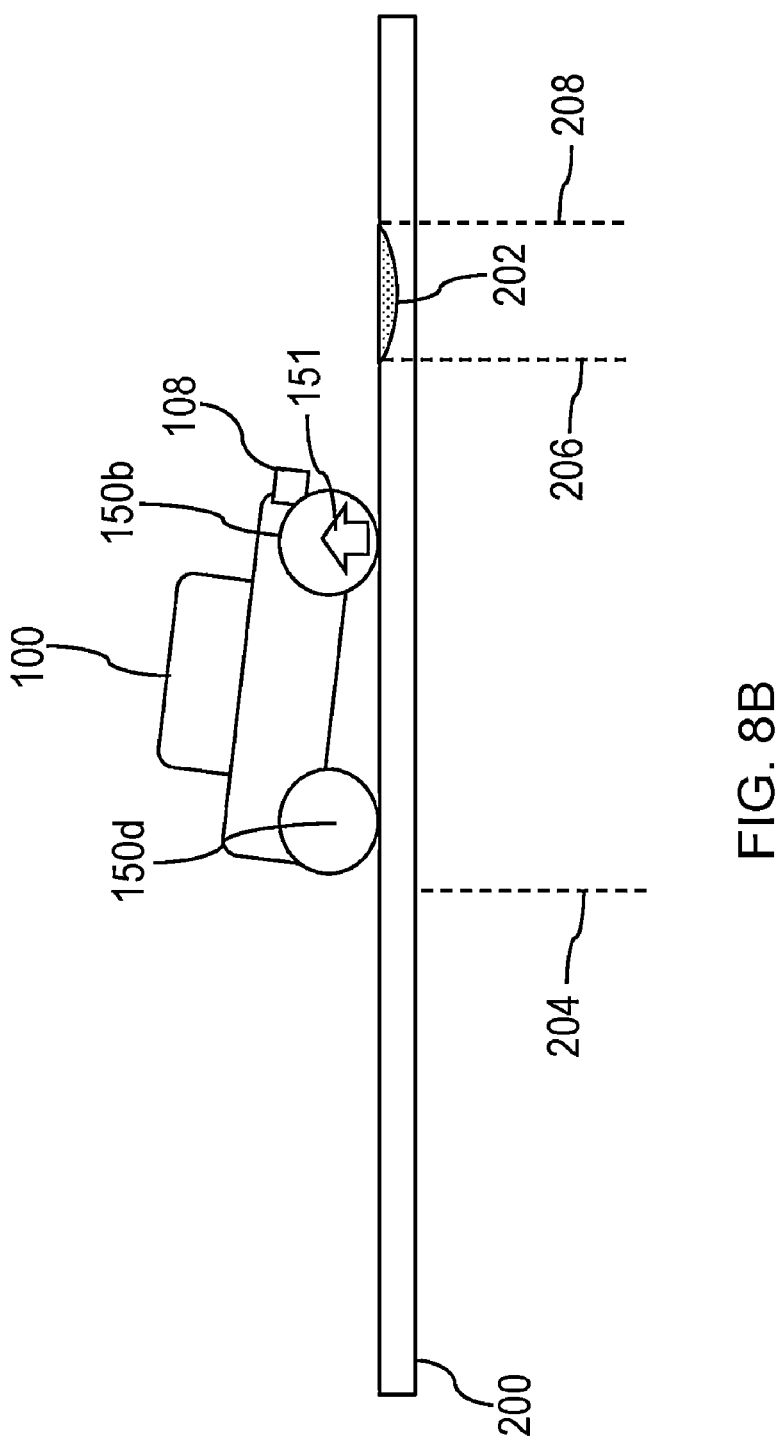
FIG. 8B is a schematic of the vehicle and road of FIG. 8A in a second state.

FIG. 8B is a schematic of the vehicle 100 and road 200 of FIG. 8A in a second state. As shown in FIG. 8B, the vehicle has begun a braking event after crossing line 204. As a result of braking force applied at the front wheels 150b and rear wheels 150d, load transfer shifts a normal force load from a rear axle connected to rear wheel 150d to a front axle connected to front wheel 150b. As shown in FIG. 8B, the vehicle 100 pitches down as a result. Accordingly, relative to the status of FIG. 8A, the normal force load is increased, as shown by arrow 151. In some embodiments, as discussed previously, the active suspension of the vehicle may be operated to damp pitch oscillations related to this pitching motion of the vehicle, to reduce fluctuations in normal load of the vehicle wheels.

Figure 8C:
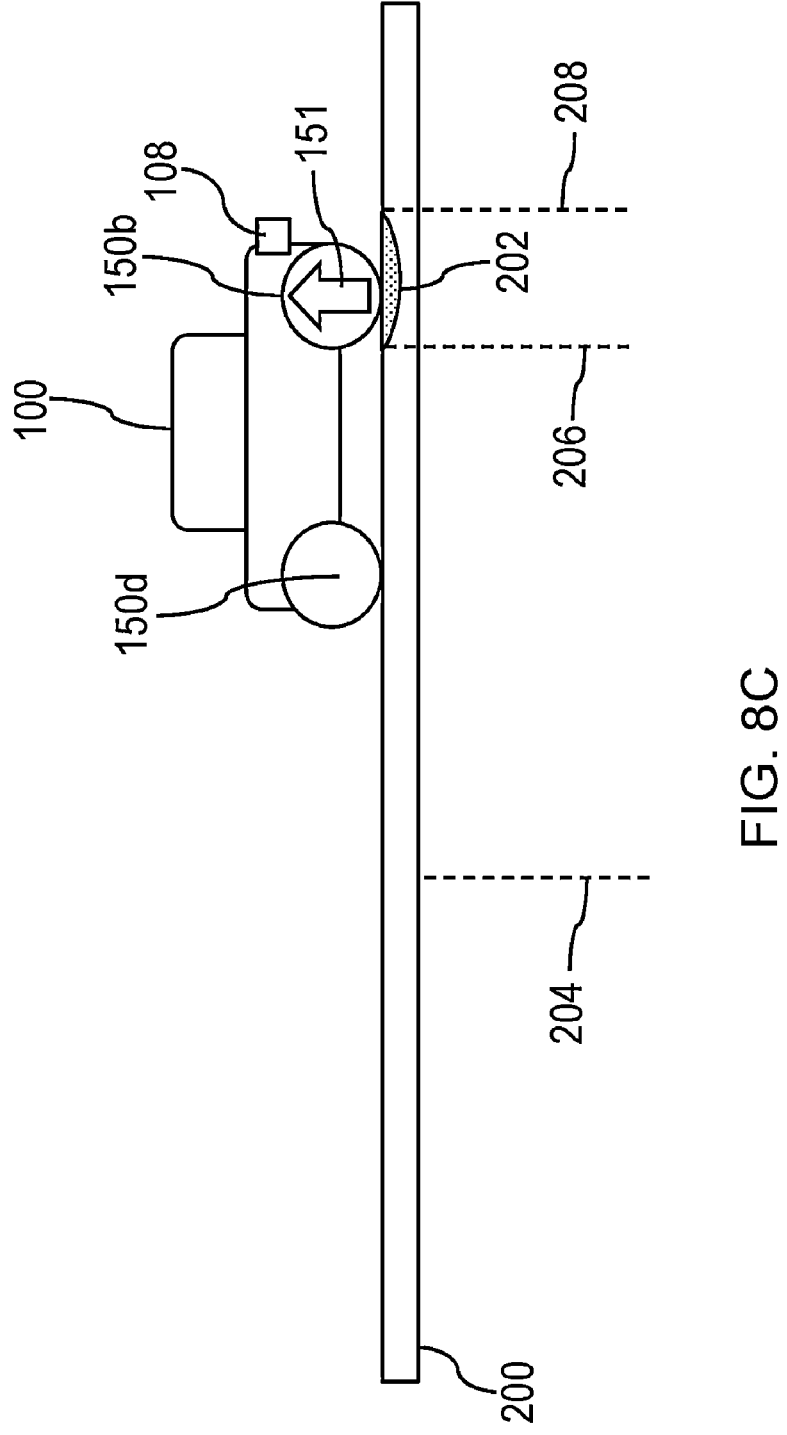
FIG. 8C is a schematic of the vehicle and road of FIG. 8A in a third state.

According to the embodiment of FIGS. 8A-8D, the forward-looking sensor 108 may sense the road disturbance before the vehicle reaches the road disturbance. A vehicle control system of the vehicle 100 may determine a size of the road disturbance and may prepare an active suspension response to compensate for a loss in braking force caused by the road disturbance. In some embodiments, the road disturbance may also be included in reference road information that may be stored onboard the vehicle. According to the embodiment of FIGS. 8A-8D, the road disturbance 202 is relatively small, meaning that the vehicle may pass the road disturbance in less than one second. To compensate for a loss of braking force when the vehicle crosses the road disturbance, the active suspension system may apply a pitch acceleration to the vehicle to temporarily increase a normal load on the front axle of the vehicle, as shown in FIG. 8C. In cases where the road disturbance is larger, such a temporary increase of normal load may not be applied.

FIG. 8C is a schematic of the vehicle 100 and road 200 of FIG. 8A in a third state. As shown in FIG. 8C, the active suspension of the vehicle 100 has pushed the front end of the vehicle upward, and correspondingly increased the load on the front wheel 150b, as denoted by arrow 151 relative to FIG. 8B. As the acceleration imparted to the vehicle is temporary, the increase in normal load is also temporary. Accordingly, the active suspension may not apply such an acceleration until the front wheel 150b reaches the start line 206 of the road disturbance 202. With the increase normal force, braking force may be maintained through the road disturbance. In some embodiments, the forward-looking sensor 108 may provide information regarding the location of the start line 206 and end line 208 so that the active suspension may be controlled accordingly.

Figure 8D:
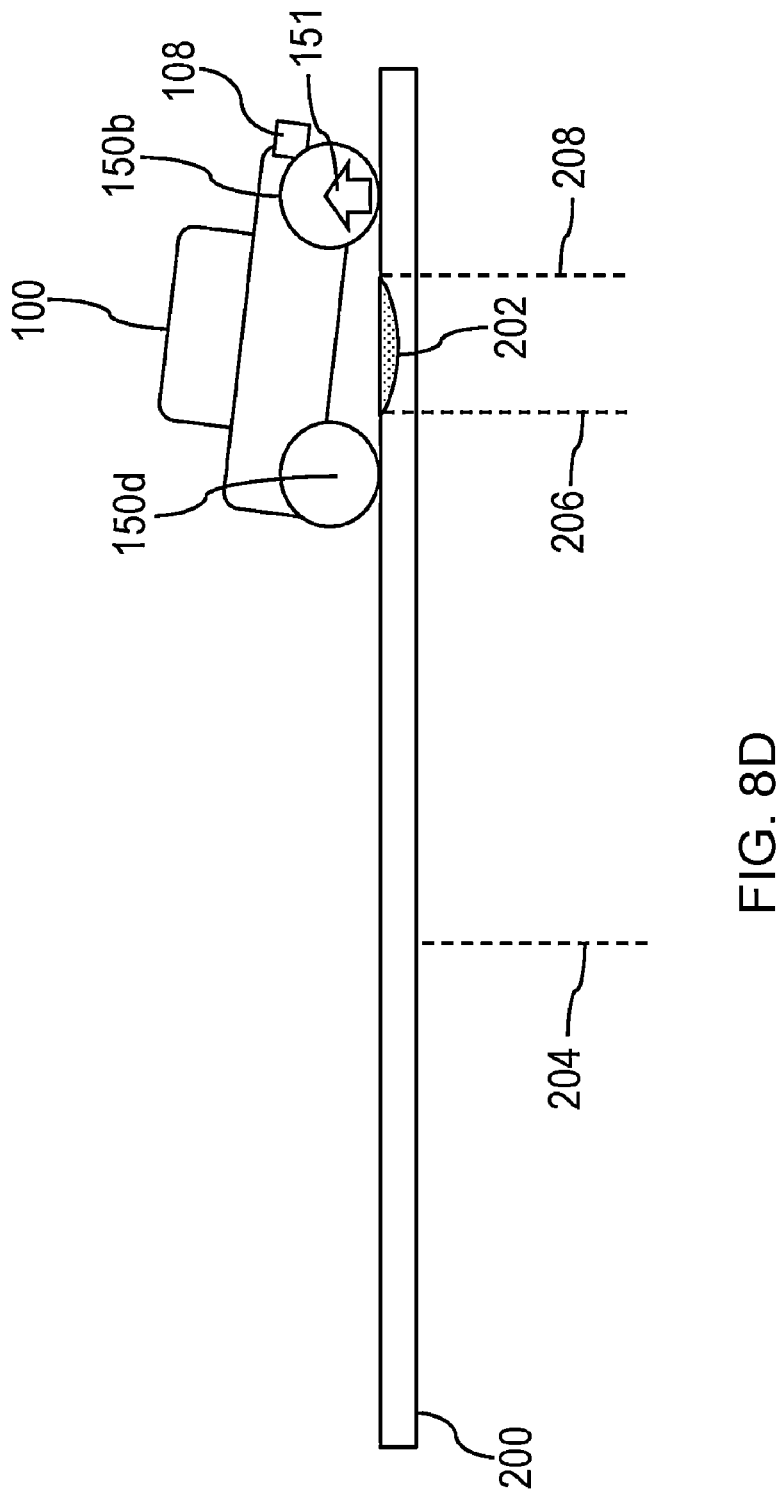
FIG. 8D is a schematic of the vehicle and road of FIG. 8A in a fourth state.

FIG. 8D is a schematic of the vehicle 100 and road 200 of FIG. 8A in a fourth state. As shown in FIG. 8D, once the temporary acceleration of the vehicle 100 is completed and the vehicle has at least partially passed the road disturbance 202, the vehicle may return to a position with the vehicle body pitched toward the front of the vehicle. Accordingly, the normal force load may also return to a normal force load similar to that shown in FIG. 8B. Of course, during the transition from increased normal force load back to the original normal force load, the normal force load may be temporarily reduced, and the vehicle body accelerates back toward the front wheel 150b. However, as the front wheel 150b is no longer located on the road disturbance 202, this temporary loss in normal force may not substantially affect braking force.

Figure 9:
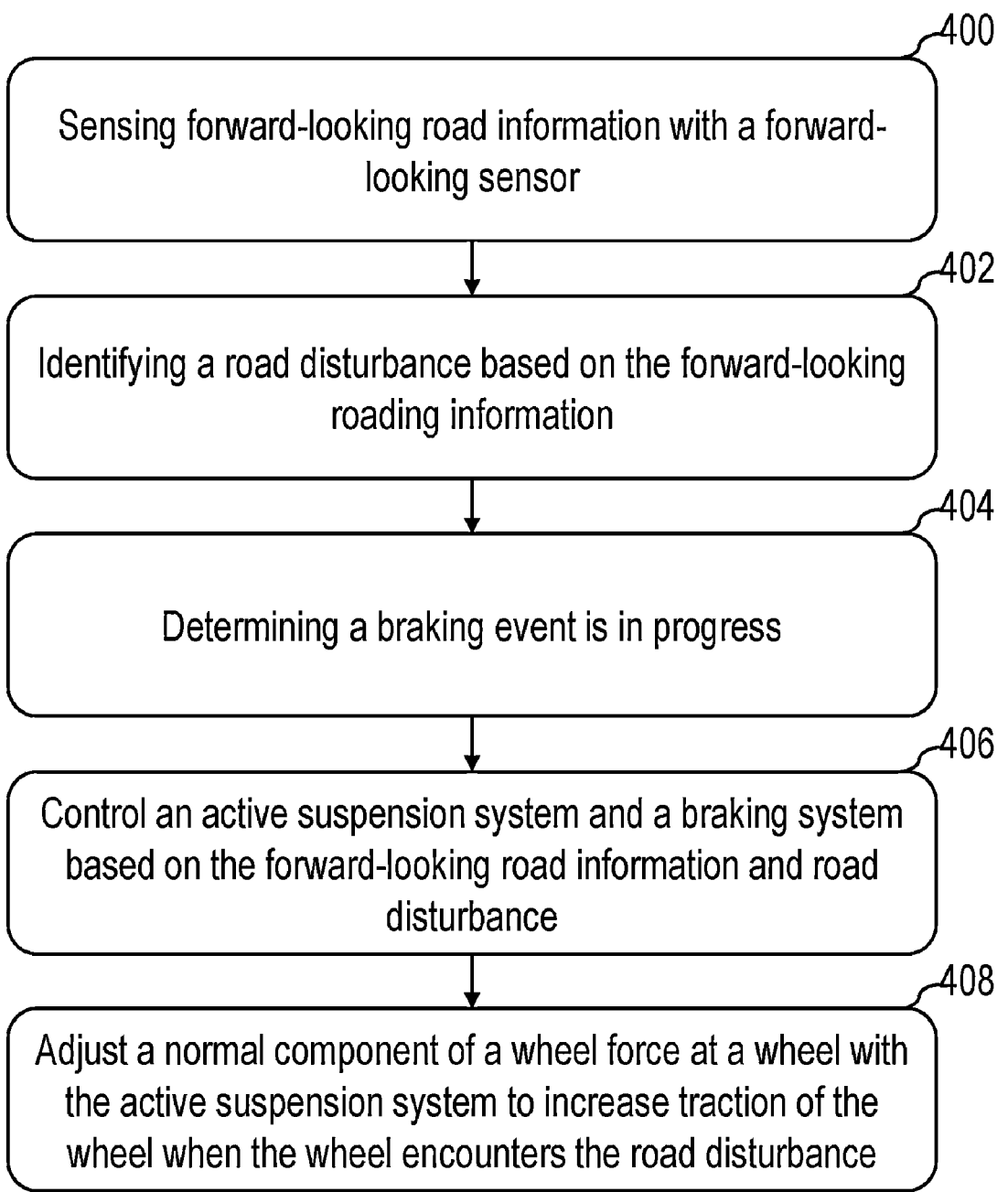
FIG. 9 is a flow chart for another embodiment of a method of controlling a vehicle.

FIG. 9 is a flow chart for another embodiment of a method of controlling a vehicle. In block 400, forward-looking road information is sensed with a forward-looking sensor. In block 402, a road disturbance is identified based on the forward-looking road information. For example, at least one processor may employ image processing techniques and/or machine learning to determine the presence of a road disturbance, and one or more characteristics of the road disturbance such as size. In block 404, it may be determined that a braking event is in progress. In block 406, an active suspension system may be controlled along with a braking system based on the forward-looking road information and road disturbance. In block 408, a normal component of wheel force at a wheel is adjusted with the active suspension system to increase traction of the wheel when the wheel encounters the road disturbance. For example, in some embodiments, a twist force may be applied to a vehicle. As another example, in some embodiments, a pitch of the vehicle may be adjusted to temporarily increase normal force load on a wheel. It should be noted that while the method of FIG. 9 employs forward-looking road information, reference road information may also be employed alone or in combination with forward-looking road information, as the present disclosure is not so limited. In some embodiments, the method may also include determining an expected response of the vehicle during the braking event. For example, in some embodiments, determining the expected response may include determining the loss of braking force expected based on road disturbance. The method may include controlling the braking system and the active suspension system based at least partially on the determined expected response (e.g., adjusting normal force loads of the wheels to compensate for the road disturbance).

Figure 10:
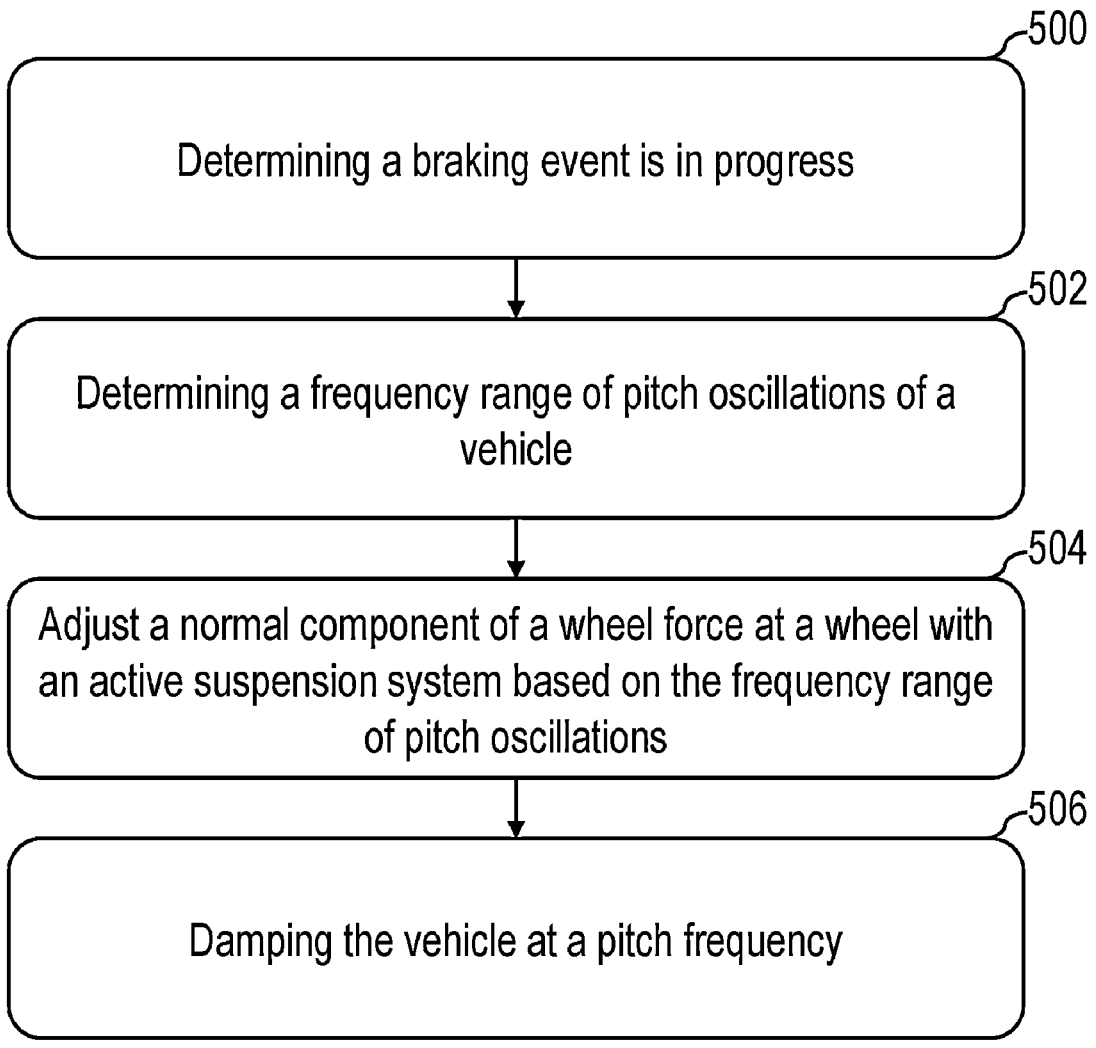
FIG. 10 is a flow chart for yet another embodiment of a method of controlling a vehicle.

FIG. 10 is a flow chart for yet another embodiment of a method of controlling a vehicle. In block 500 it is determined that a braking event is in progress. In block 502, a frequency range of pitch oscillation of the vehicle is determined. In some embodiments, the range pitch frequencies may be determined based on, for example, previously collected and stored data or information from an IMU. In some embodiments, the range of pitch frequencies may be determined based on information from a braking system. In block 504, a normal component of a wheel force at a wheel may adjusted with an active suspension system based at least partially on the range of pitch oscillation frequencies. In block 506, the vehicle is damped at the pitch frequency in the range of frequencies in block 502. In some cases, depending on the range of pitch frequencies, different portions of the vehicle may be damped. For example, in some embodiments, a pitch frequency range between 1 and 10 Hz may result in a sprung mass of the vehicle being damped. As another example, in some embodiments, a pitch frequency between 10 and 25 Hz may result in an unsprung mass of the vehicle being damped. In some embodiments, the method may also include determining an expected response of the vehicle during the braking event. For example, in some embodiments, determining the expected response may include determining the loss of braking force expected based on the pitch oscillation frequencies. The method may include controlling the braking system and the active suspension system based at least partially on the determined expected response (e.g., adjusting normal force loads of the wheels to damp the pitch oscillations).

Figure 11A:
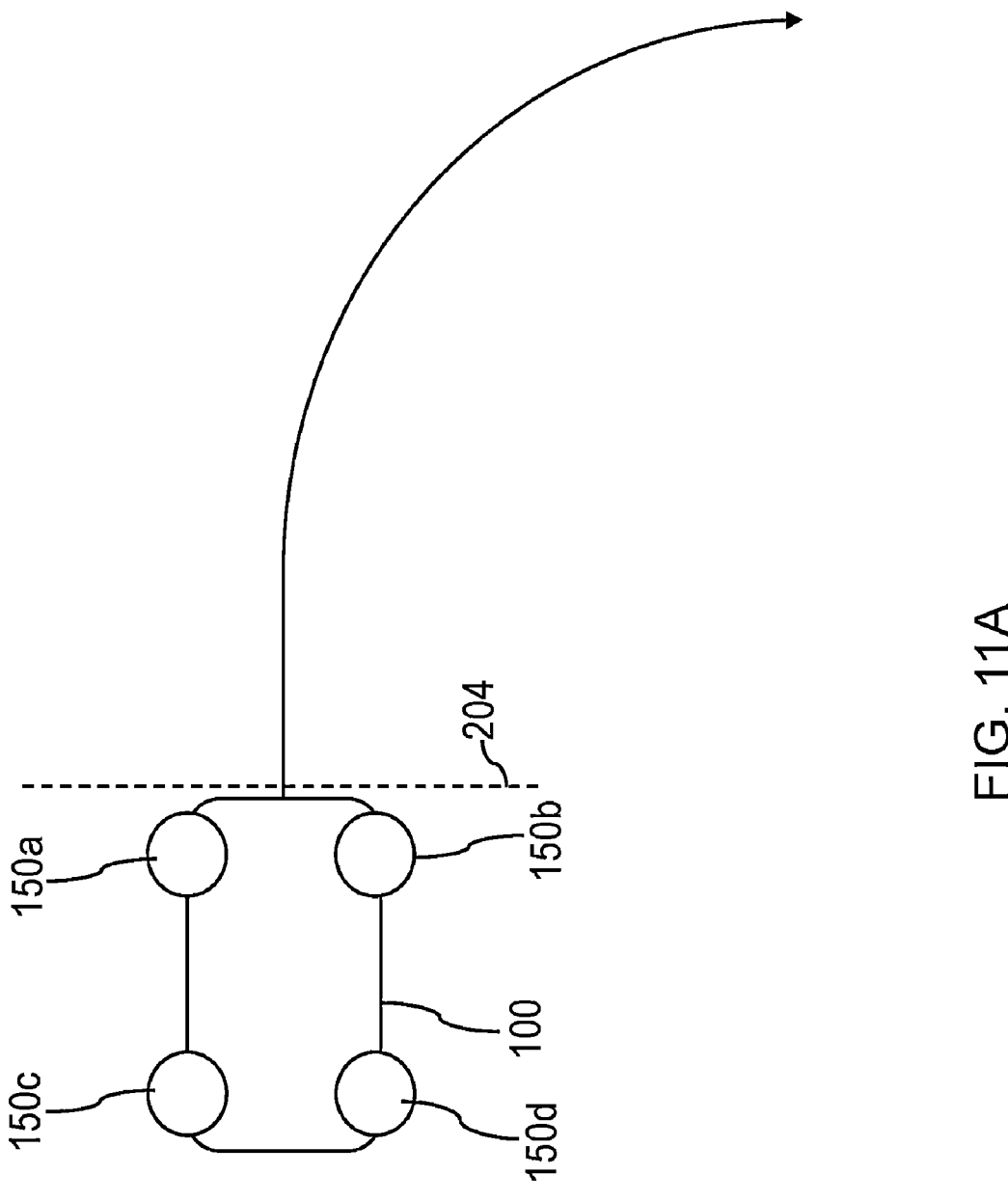
FIG. 11A is a schematic of one embodiment of a vehicle in a first state.

FIGS. 11A-11D depict a scenario with a vehicle 100 in a combination cornering and braking event. As shown in FIG. 11A, the vehicle 100 includes a first wheel 150a (e.g., front left wheel), a second wheel 150b (e.g., front right wheel), a third wheel 150c (e.g., rear left wheel), and a fourth wheel 150d (e.g., rear right wheel). The size of the wheels shown in FIGS. 11A-11D corresponds to a normal component of a wheel force at a respective wheel. As shown in FIG. 11A, the vehicle is in steady state and the normal components are accordingly balanced and approximately equal to one another. The vehicle includes an active suspension system that may be configured to independently adjust a normal component of a wheel force of each wheel. As shown in FIG. 11A, the vehicle is in a first state prior to starting the braking and cornering event at line 204.

Figure 11B:
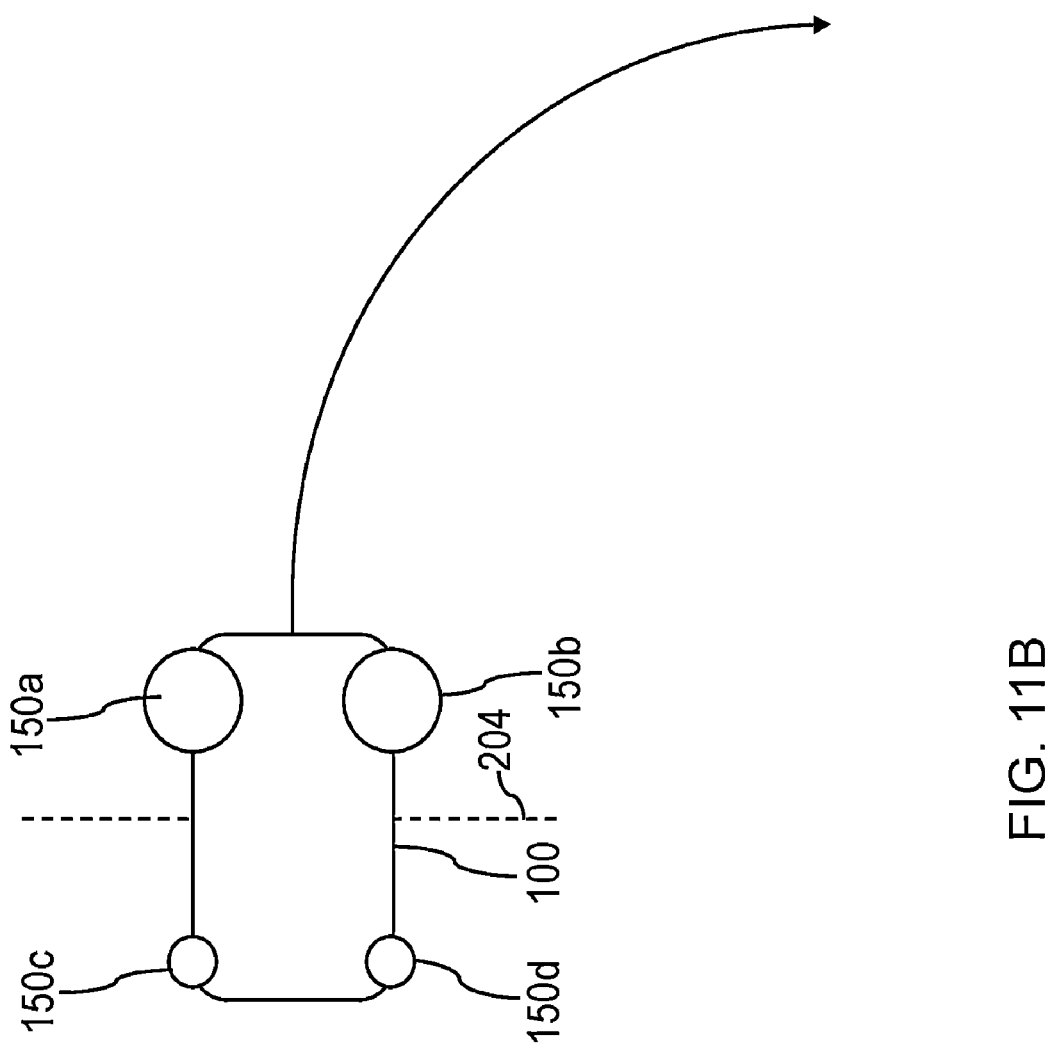
FIG. 11B is a schematic of the vehicle of FIG. 11A in a second state.

FIG. 11B is a schematic of the vehicle 100 of FIG. 11A in a second state after initiating the braking and cornering event. As shown in FIG. 11B, the application of braking force results in load transfer from the rear wheels 150c, 150d to the front wheels 150a, 150b, with a corresponding increase in normal force. Compared with FIG. 11A, the normal force loads of the first wheel 150a and second wheel 150b are greater, whereas the normal force loads of the third wheel 150c and fourth wheel 150d are reduced. In the state shown in FIG. 11B, the active suspension has not been activated, and the vehicle has not initiated a turn.

Figure 11C:
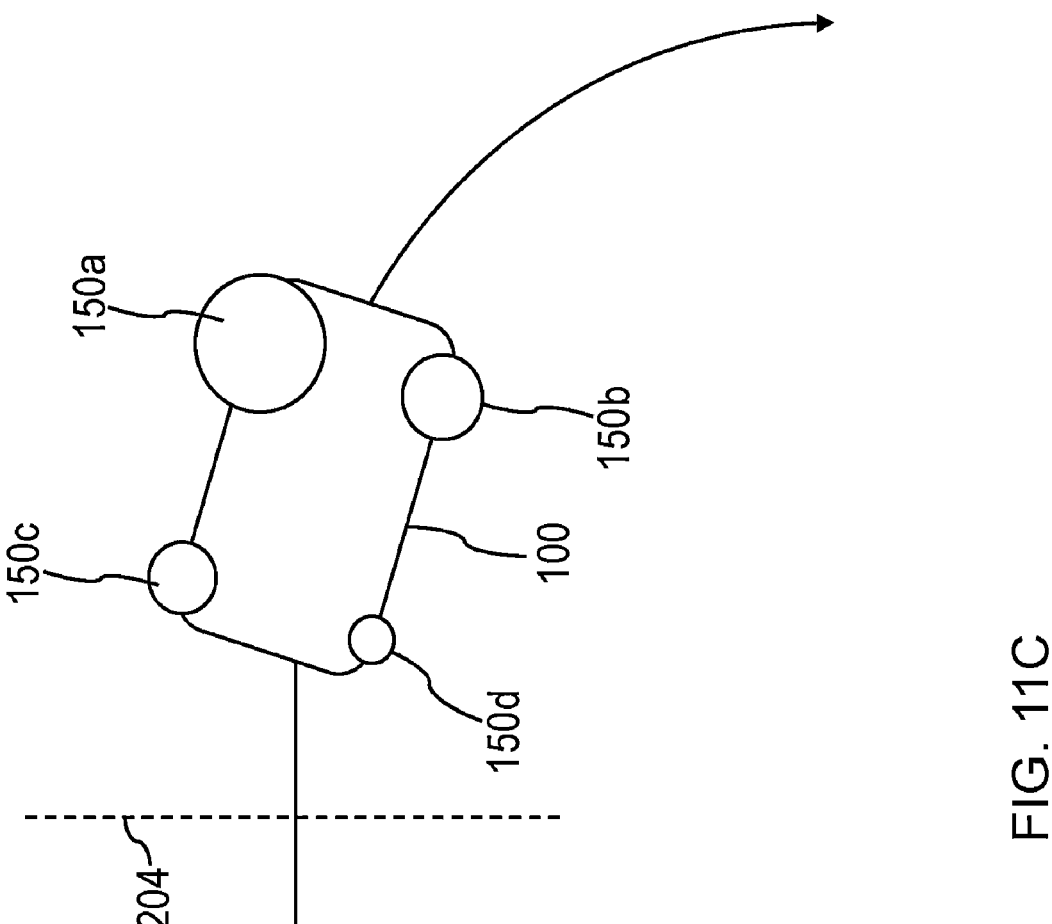
FIG. 11C is a schematic of the vehicle of FIG. 11A in a third state.

FIG. 11C is a schematic of the vehicle 100 of FIG. 11A in a third state where the turn has been initiated. As shown in FIG. 11C, initiating the turn induces a roll acceleration on the vehicle which causes load transfer from one side of the vehicle to the other side of the vehicle. In particular, normal load is shifted from the right side of the vehicle to the left side of the vehicle. As a result, the first wheel 150a has a greater normal load than in the state of FIG. 11B, whereas the second wheel 150b has a reduced normal load than in the state of FIG. 11B. Likewise, the third wheel 150c has an increased normal load compared with that state of FIG. 11B, whereas the fourth wheel 150d has a reduced normal load compared with the state of FIG. 11B. As a result, a yaw moment is induced on the vehicle which urges the vehicle out of the turn because of the disparity in normal force loads. A vehicle control system may detect this disparity and differences in wheel slip and adjust the normal force loads on the wheels with an active suspension system, as shown in FIG. 11D.

Figure 11D:
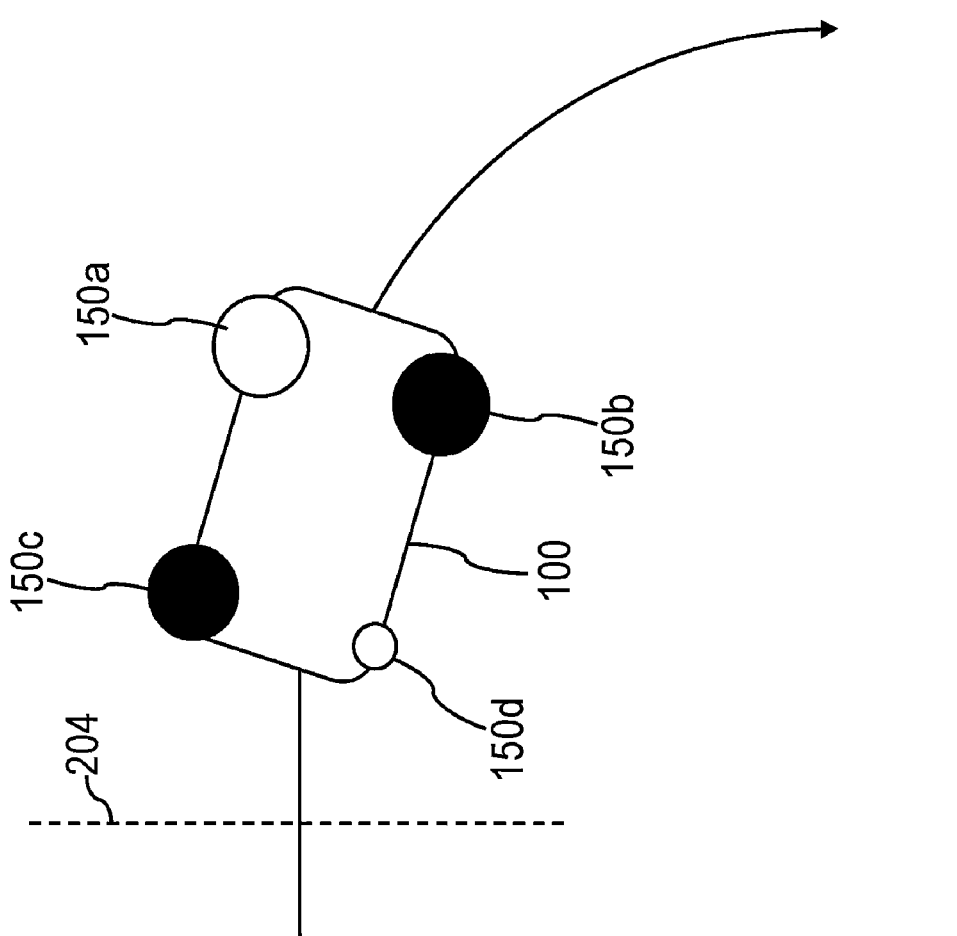
FIG. 11D is a schematic of the vehicle of FIG. 11A in a fourth state.

FIG. 11D is a schematic of the vehicle 100 of FIG. 11A in a fourth state. As shown in FIG. 11D, a twist force is applied to the vehicle. In particular, a normal load is increased at the second wheel 150b and the third wheel 150c. As a result, normal force load is shifted away from the first wheel 150a and the fourth wheel 150d. According to the embodiment of FIG. 11D, the normal load on the first wheel 150a and the second wheel 150b is approximately equal. Accordingly, the yaw moment generated by braking differences between two front wheels may be reduced or eliminated. Additionally, the application of twist force may distribute the normal force load more evenly between the first wheel, second wheel, and third wheel, to allow the vehicle to stay in the intended path during the turn. Furthermore, as more normal load may be applied to the front wheels 150a, 150b overall, the overall braking force may be increased compared with a passive suspension system. In this manner, the adjustment of normal forces by an active suspension system may improve the performance of a vehicle in cornering and/or braking events. In some embodiments, a vehicle control system may determine that a braking force demand exceed a threshold braking force and may apply a twist force to the vehicle in response to ensure that a desired braking force is generated for a particular scenario.

In some embodiments, the application of twist force in this scenario may be dependent on an observation of desired yaw motion of the vehicle. For example, if the vehicle is determined to be understeering too much (e.g., if the vehicle's yaw rate is determined to be lower than a desired yaw rate determined by the control system by at least a value equal to a threshold value), then the active suspension force may be applied as described in FIG. 11A-D. For example, if the vehicle is determined to be oversteering too much (e.g. if the vehicle's yaw rate is determined to be greater than a desired yaw rate determined by the control system by at least a value equal to a threshold value) then the application of active suspension force may be inverted to increase the normal load on the first wheel 150a and the fourth wheel 150d, and decrease the normal load on the second wheel 150b and third wheel 150c. in some embodiments, this application of force may be dynamically altered to control the yaw response of the vehicle to match a desired response. In some embodiments, this desired response may be determined by a calculation in the vehicle control system, or may be predetermined.

Figure 12:
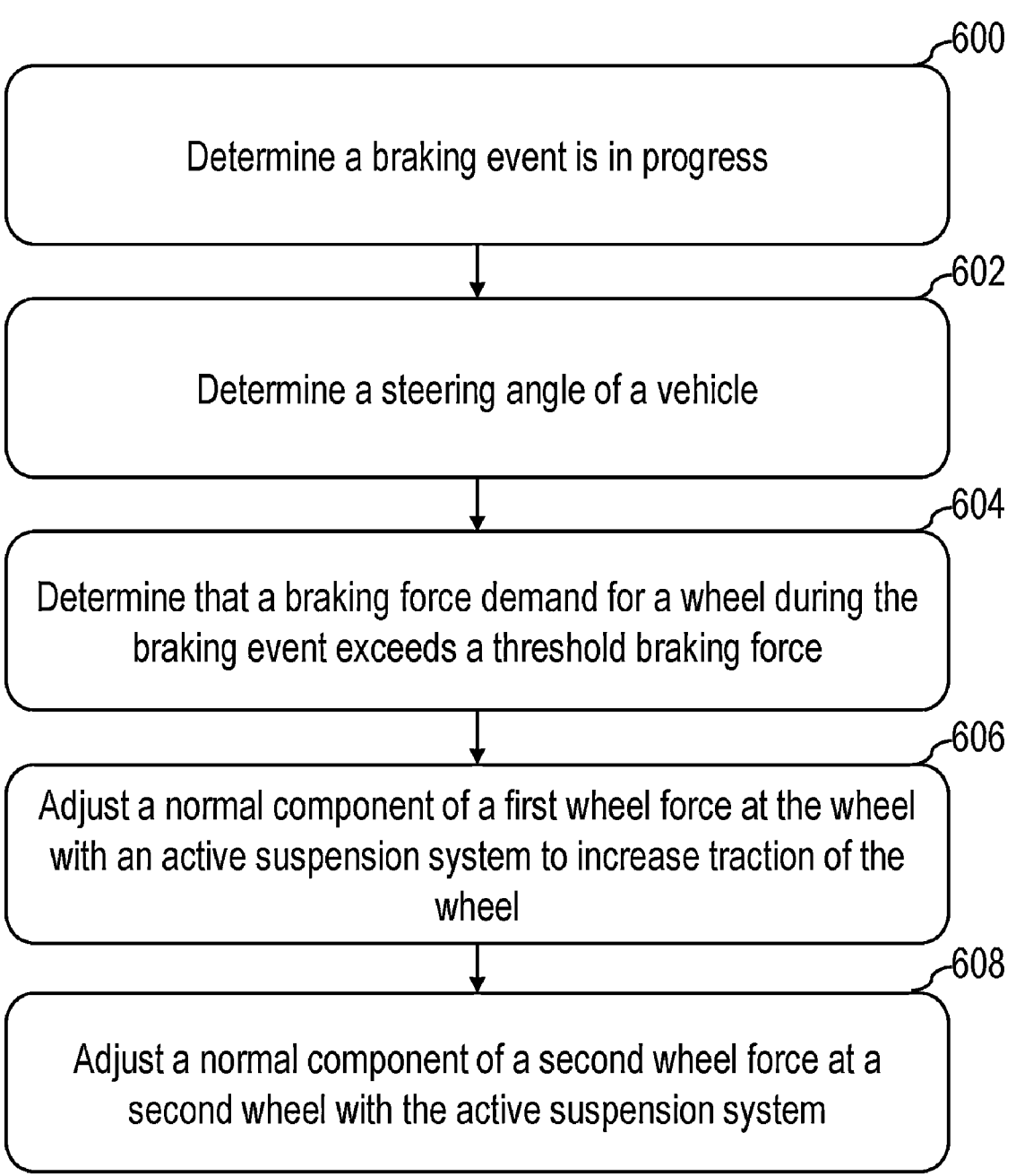
FIG. 12 is a flow chart for yet another embodiment of a method of controlling a vehicle.

FIG. 12 is a flow chart for yet another embodiment of a method of controlling a vehicle. In block 600, it is determined that a braking event is in progress. In block 602, a steering angle of the vehicle is determined (e.g., with information from a rotary encoder, potentiometer, or other suitable sensor). In block 604, it is determined that a braking force demand for a wheel during the braking event exceeds a threshold braking force. In some embodiments such a determination may be based on the activation of an ABS system. In some embodiments, such a determination may be based on an amount of braking force (e.g., brake pedal force) applied by a user of the vehicle or by the timing or rate of such an application. In block 606, a normal component of a first wheel force at the wheel is adjusted with an active suspension system to increase traction of the wheel. In block 608, a normal component of a second wheel force at a second wheel is adjusted with the active suspension system. In some embodiments, the first wheel and second wheel may be positioned at opposite corners of the vehicle, such that a twist force is applied to the vehicle. In some embodiments, the method may also include determining an expected response of the vehicle during the braking event. For example, in some embodiments, determining the expected response may include determining understeer will occur based on the load transfer described with reference to FIGS. 11A-11D. The method may include controlling the braking system and the active suspension system based at least partially on the determined expected response (e.g., applying a twist force).

The above-described embodiments of the technology described herein can be implemented in any of numerous ways. For example, the embodiments may be implemented using hardware, software, or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the embodiments described herein may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present disclosure as discussed above. As used herein, the term "computer-readable storage medium" encompasses only a non-transitory computer-readable medium that can be considered to be a manufacture (i.e., article of manufacture) or a machine. Alternatively or additionally, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present disclosure as discussed above. Additionally, it should be appreciated that according to one aspect of this embodiment, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

The invention claimed is:
1. A vehicle comprising:
a first wheel;
a second wheel;
a braking system configured to apply braking force to the first wheel and the second wheel;
an active suspension system operatively coupled to the first wheel and the second wheel, wherein the active suspension system is configured to apply active forces to the first wheel and the second wheel in at least one mode of operation to adjust a normal component of a first wheel contact force between the first wheel and a road surface and to adjust a normal component of a second wheel contact force between the second wheel and the road surface, wherein the first wheel is a front wheel of the vehicle, the second wheel is a rear wheel of the vehicle, and the first wheel and second wheel are positioned at opposite corners of the vehicle;
a forward-looking road information system configured to receive forward-looking road information; and
at least one processor configured to control the braking system and the active suspension system, wherein the at least one processor is configured to:
receive the forward-looking road information from the forward-looking road information system,
detect a road disturbance based on the forward-looking road information received from the forward-looking road information system, the road disturbance comprising a change in friction of the road surface relative to a nominal road friction,
control the braking system and the active suspension system based at least partially on the detected road disturbance, and
control the active suspension system to increase the normal component of the first wheel and the normal component of the second wheel based at least partially on the detected road disturbance, such that a twist force is applied to the vehicle during braking.
2. The vehicle of claim 1, wherein the forward-looking road information includes a turn.
3. The vehicle of claim 1, wherein the first wheel is a first front wheel of the vehicle, the second wheel is a second front wheel of the vehicle, and the at least one processor is configured to control the active suspension system to adjust a pitch of the vehicle.
4. The vehicle of claim 3, wherein the forward-looking road information includes a road disturbance, and wherein the at least one processor is configured to control the active suspension system to temporarily increase the normal com- ponent of the first wheel contact force and the normal component of the second wheel contact force based on the road disturbance.

5. The vehicle of claim 3, wherein the at least one processor is configured to determine a braking event is in progress, wherein the at least one processor is configured to determine a pitch frequency of the vehicle based on the braking event, and wherein the at least one processor is configured to control the active suspension system to adjust the pitch of the vehicle based on the determined pitch frequency.

6. The vehicle of claim 1, wherein the first wheel is a first side wheel of the vehicle, the second wheel is a second side wheel of the vehicle positioned on a same side of the vehicle, and the at least one processor is configured to control the active suspension system to adjust a roll of the vehicle.

7. The vehicle of claim 6, wherein the forward-looking road information includes a road disturbance, and wherein the at least one processor is configured to control the active suspension system to temporarily increase the normal component of the first wheel contact force and the normal component of the second wheel contact force based on the road disturbance.

8. The vehicle of claim 1, wherein the at least one processor is configured to:

determine a braking event is in progress;

determine an expected response of the vehicle during the braking event; and control the braking system and the active suspension system based on the expected response.

9. The vehicle of claim 1, wherein the forward-looking road information includes a road disturbance having a disturbance size, wherein the at least one processor is configured to determine whether the disturbance size exceeds an activation threshold, wherein the at least one processor is configured to disable the active suspension system if the disturbance size does not exceed the activation threshold for a duration of a braking event.

10. The vehicle of claim 1, wherein the forward-looking road information system is a LIDAR.

11. The vehicle of claim 1, wherein the forward-looking road information system is at least one camera.

12. The vehicle of claim 1, wherein the forward-looking road information system comprises one or more forward-looking sensors and/or a system that receives information about a road ahead of the vehicle from a cloud service, server, or other vehicle.

13. A method of controlling a vehicle including a braking system and an active suspension system, wherein the active suspension system is operatively coupled to a first wheel and a second wheel, wherein the first wheel is a front wheel of the vehicle and the second wheel is a rear wheel of the vehicle, and the first wheel and the second wheel are positioned at opposite corners of the vehicle, the method comprising:

receiving forward-looking road information with a forward-looking road information system;

determining a presence of a road disturbance based on the forward-looking road information, wherein a friction of the road disturbance is less than a nominal road friction;

controlling the braking system and the active suspension system based at least partially on the road disturbance, wherein controlling the active suspension system includes applying active forces to the first wheel and the second wheel to adjust a normal component of a first wheel contact force between the first wheel and a road surface and to adjust a normal component of a second wheel contact force between the second wheel and the road surface; and during braking, controlling the active suspension system to apply a twist force to the vehicle by increasing the normal component of the first wheel contact force and the normal component of the second wheel contact force.

14. The method of claim 13, wherein the forward-looking road information system comprises one or more forward-looking sensors and/or a system that receives road information about a road ahead of the vehicle from a cloud service, server, or another vehicle.

15. The method of claim 13, wherein the forward-looking road information includes a turn.

16. The method of claim 13, further comprising determining that a braking force demand for a first wheel during a braking event exceeds a threshold braking force, and, upon determining that the braking force demand exceeds the threshold braking force, adjusting the normal component of a wheel force at the first and second wheels of the vehicle with the active suspension system to increase an average traction force at the first wheel during the braking event.

17. The method of claim 13, further comprising determining if a yaw metric exceeds a threshold and controlling the braking system and the active suspension system in order to reduce the yaw metric below the threshold.

18. The method of claim 13, further comprising determining an absolute value of wheel slip based on wheel torque, wheel speed, and vehicle speed for the wheels of the vehicle and if the wheel slip for one wheel exceeds a threshold, the twist force may be applied to increase a normal force load on that wheel.

* * * * *